United States Patent
Choi et al.

(10) Patent No.: US 12,261,785 B2
(45) Date of Patent: Mar. 25, 2025

(54) APPARATUS AND METHOD FOR MULTIPLEXING SWITCHING OF INTEGRATED ACCESS AND BACKHAUL NODE IN WIRELESS COMMUNICATION SYSTEM

(71) Applicant: Samsung Electronics Co., Ltd., Suwon-si (KR)

(72) Inventors: Seunghoon Choi, Suwon-si (KR); Youngbum Kim, Suwon-si (KR); Hyunseok Ryu, Suwon-si (KR); Sungjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 17/741,816

(22) Filed: May 11, 2022

(65) Prior Publication Data
US 2022/0368478 A1 Nov. 17, 2022

(30) Foreign Application Priority Data
May 11, 2021 (KR) .......................... 10-2021-0060754

(51) Int. Cl.
*H04W 88/14* (2009.01)
*H04L 5/00* (2006.01)

(52) U.S. Cl.
CPC .......... *H04L 5/0023* (2013.01); *H04L 5/0053* (2013.01); *H04W 88/14* (2013.01)

(58) Field of Classification Search
CPC ..... H04L 5/0023; H04L 5/0053; H04W 88/14
See application file for complete search history.

(56) References Cited

U.S. PATENT DOCUMENTS

2020/0275499 A1   8/2020  Novlan et al.
2021/0235476 A1*  7/2021  Luo ........................ H04W 40/22
(Continued)

FOREIGN PATENT DOCUMENTS

CN   101300805 B   * 12/2011   ........ H04W 72/1252
WO   2020/202190 A1  10/2020

OTHER PUBLICATIONS

3GPP TS 38.300 V17.0.0, 3rd Generation Partnership Project, Technical Specification Group Radio Access Network, NR, NR and NG-RAN Overall Description, Stage 2 (Release 17), Mar. 2022.
(Continued)

*Primary Examiner* — Marcus Smith
*Assistant Examiner* — Zhaohui Yang
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. A method performed by an integrated access and backhaul (IAB) node in a wireless communication system is provided. The method includes receiving multiplexing related configuration information of a mobile termination (MT) of the IAB node and a distributed unit (DU) of the IAB node from an upper IAB node, the multiplexing including spatial division multiplexing (SDM), frequency division multiplexing (FDM), and time division multiplexing (TDM), performing fallback from the FDM or the SDM to the TDM, and in response to the fallback, based on the configuration information, transmitting and receiving data of the DU of the IAB node.

16 Claims, 15 Drawing Sheets

(56) References Cited

U.S. PATENT DOCUMENTS

2022/0225286 A1* 7/2022 Cirik ................. H04W 72/0446
2022/0337344 A1* 10/2022 Gao ..................... H04L 5/0051
2024/0080810 A1* 3/2024 Kurita .................. H04W 72/04

OTHER PUBLICATIONS

3GPP TS 38.473 V17.0.0, 3rd Generation Partnership Project, Technical Specification Group Radio Access Network, NG-RAN, F1 application protocol (F1AP) (Release 17), Apr. 2022.
Ericsson, Resource multiplexing and DC in enhanced IAB, R1-2103712, 3GPP TSG-RAN WG1 Meeting #104-bis-e, eMeeting, Apr. 6, 2021.
NTT DOCOMO, INC., Resource multiplexing between child and parent links of an IAB node, R1-2103591, 3GPP TSG RAN WG1 #104bis-e, e-Meeting, Apr. 7, 2021.
Cewit et al., Discussions on enhancements to resource multiplexing between child and parent links of an IAB node, R1-2103374, 3GPP TSG-RAN WG1 Meeting #104b-e, e-Meeting, Apr. 7, 2021.
VIVO, Enhancement to resource multiplexing between child and parent links, R1-2102538, 3GPP TSG RAN WG1 #104b-e, e-Meeting, Apr. 6, 2021.
International Search Report and Written Opinion dated Aug. 18, 2022, issued in International Patent Application No. PCT/KR2022/006744.
Moderator (AT&T), "Feature Lead Summary #4 of 8.10.1", R1-2202874, 3GPP TSG RAN WG1 #108-e, Mar. 4, 2022, XP052122344.
Extended European Search Report dated Jul. 19, 2024, issued in European Patent Application No. 22807837.4.

* cited by examiner

APPARATUS AND METHOD FOR MULTIPLEXING SWITCHING OF INTEGRATED ACCESS AND BACKHAUL NODE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0060754, filed on May 11, 2021, in the Korean Intellectual Property Office, the disclosure of which is incorporated by reference herein in its entirety.

BACKGROUND

1. Field

The disclosure relates to a wireless communication system. More particularly, the disclosure relates to a communication method and an apparatus of an integrated access and backhaul (IAB) node.

2. Description of Related Art

Various researches are recently conducted to utilize an integrated access and backhaul (IAB) technology, and accordingly it is also required to improve dual access of an IAB node.

5th generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively supporting multiplexing of a mobile termination (MT) of an integrated access and backhaul (IAB) node and a distributed unit (DU) of the IAB node, in a wireless communication system.

Another aspect of the disclosure is to provide an apparatus and a method for setting a multiplexing scheme of an MT of an IAB node and a DU of the IAB node to frequency division multiplexing (FDM) or spatial division multiplexing (SDM), in a wireless communication system.

Another aspect of the disclosure is to provide an apparatus and a method for operating resources, if a multiplexing scheme fallback of an MT of an IAB node and a DU of the IAB node is fallback from FDM or SDM to time division multiplexing, in a wireless communication system.

Additional aspects will be set forth in part in the description which follows and, in part, will be apparent from the description, or may be learned by practice of the presented embodiments.

In accordance with an aspect of the disclosure, a method performed by an integrated access and backhaul (IAB) node in a wireless communication system is provided. The method includes receiving multiplexing related configuration information of a mobile termination (MT) of the IAB node and a distributed unit (DU) of the IAB node from an upper IAB node, the multiplexing including spatial division multiplexing (SDM), frequency division multiplexing (FDM), and time division multiplexing (TDM), performing fallback from the FDM or the SDM to the TDM, and in response to the fallback, based on the configuration information, transmitting and receiving data of the DU of the IAB node.

In accordance with another aspect of the disclosure, an apparatus of an IAB node in a wireless communication system is provided. The apparatus includes at least one transceiver, and at least one processor, and the at least one processor is configured to receive multiplexing related configuration information of an MT of the IAB node and a DU of the IAB node from an upper IAB node, the multiplexing including SDM, FDM, and TDM, performing fallback from the FDM or the SDM to the TDM, and in response to the fallback, based on the configuration information, transmit and receive data of the DU of the IAB node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

Figure 1:
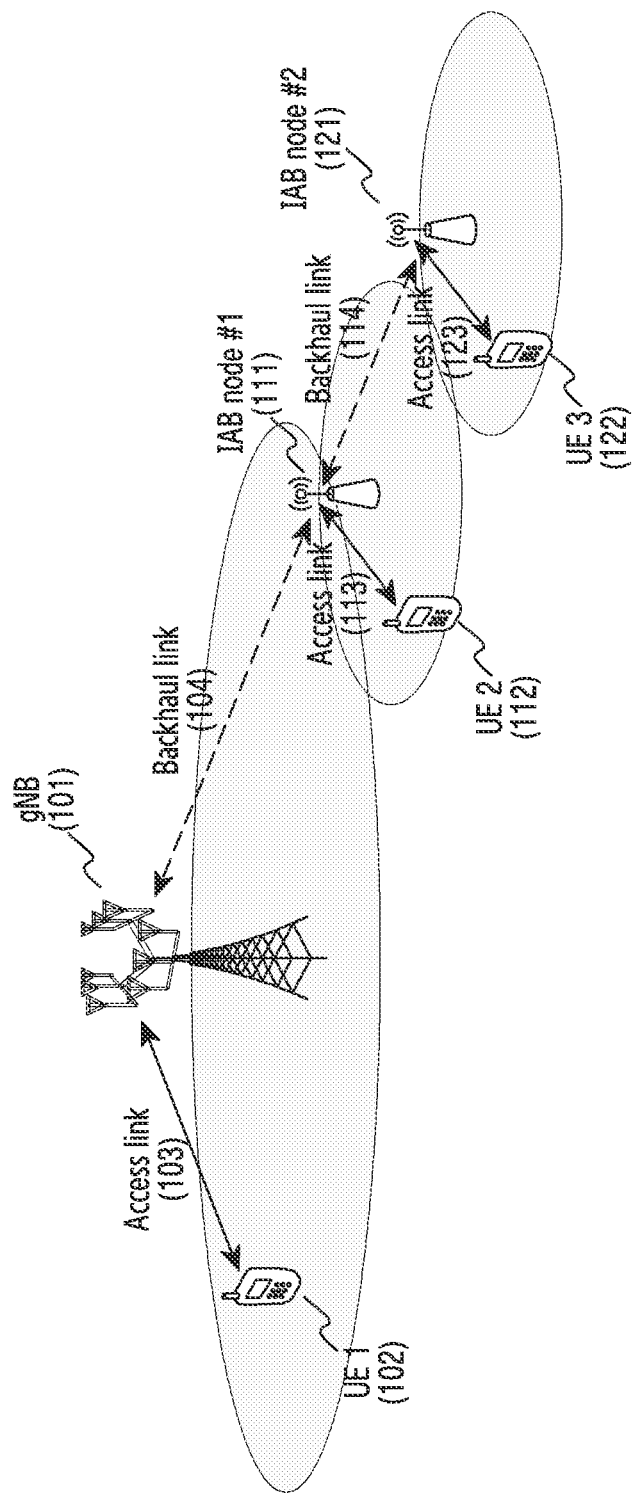
FIG. 1 is a diagram illustrating an example of a wireless communication system in which an integrated access and backhaul (IAB) node is operated according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, technical contents well known in the technical field to which the disclosure pertains and which are not directly related to the disclosure will be omitted in the specification. This is to more clearly provide the subject matter of the disclosure by omitting unnecessary descriptions without obscuring the subject matter of the disclosure.

For the same reason, some components in the accompanying drawings are exaggerated, omitted, or schematically illustrated. Also, a size of each component does not entirely reflect an actual size. The same reference number is given to the same or corresponding element in each drawing.

Advantages and features of the disclosure, and methods for achieving them will be clarified with reference to embodiments described below in detail together with the accompanying drawings. However, the disclosure is not limited to the embodiments disclosed below, but may be implemented in various different forms, the embodiments are provided to only complete the disclosure of the disclosure and to allow those skilled in the art to which the disclosure pertains to fully understand a category of the disclosure, and the disclosure is solely defined within the scope of the claims. The same reference numeral refers to the same element throughout the specification.

At this time, it will be understood that each block of the process flowchart illustrations and combinations of the flowchart illustrations may be executed by computer program instructions. Since these computer program instructions may be mounted on the processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Further, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

At this time, the term '~unit' as used in the embodiment means software or a hardware component such as a field programmable gate array (FPGA) or an application-specific integrated circuit (ASIC), and '~unit' performs specific roles. However, '~unit' is not limited to software or hardware. '~unit' may be configured to reside on an addressable storage medium and configured to reproduce on one or more processors. Accordingly, '~unit' may include, for example, components such as software components, object-oriented software components, class components and task components, processes, functions, attributes, procedures, sub-routines, segments of program code, drivers, firmware, microcode, circuitry, data, databases, data structures, tables, arrays, and variables. The functionalities provided in the components and '~unit' may be combined to fewer components and '~units' or may be further separated into additional components and '~units'. Furthermore, the components and '~units' may be implemented to reproduce one or more central processing units (CPUs) within a device or a security multimedia card. Also, '~unit' in one embodiment may include one or more processors.

A wireless communication system is evolving from its early voice-oriented service to, for example, a broadband wireless communication system which provides high-speed, high-quality packet data services according to communication standards such as high-speed packet access (HSPA) of 3rd generation partnership project (3GPP), long-term evolution (LTE) or evolved universal terrestrial radio access (E-UTRA), LTE-advanced (LTE-A), LTE-Pro, high-rate packet data (HRPD) of 3GPP 2, ultra-mobile broadband (UMB), and institute of electrical and electronics engineers (IEEE) 802.16e.

As a representative example of the broadband wireless communication system, an LTE system employs an orthogonal frequency division multiplexing (OFDM) scheme in a downlink (DL), and a single-carrier frequency-division multiple access (SC-FDMA) scheme in an uplink (UL). The UL indicates a radio link through which a terminal, a user equipment (UE), or a mobile station (MS) transmits data or a control signal to an eNode B or a base station, and the DL indicates a radio link through which a base station transmits data or a control signal to a terminal. Such a multiple-access method generally distinguishes data or control information of each user by assigning and operating time-frequency resources for carrying data or control information for each user not to overlap, that is, to establish orthogonality.

As a future communication system after LTE, that is, since a 5G (or new radio (NR)) communication system should be able to freely reflect various requirements of users and service providers, it should support a service for simultaneously satisfying various requirements. Services considered for the 5G communication systems includes enhanced mobile broadband (eMBB), massive machine-type communication (mMTC), ultra-reliable low-latency communication (URLLC) and so on.

The eMBB service aims to provide a faster data rate than a data rate supported by existing LTE, LTE-A or LTE-Pro. For example, in the 5G communication system, eMBB should be able to provide a maximum transmission rate of 20 gigabits per second (Gbps) in the DL and 10 Gbps in the UL in the view of one base station. In addition, the 5G communication system should provide the maximum transmission rate and concurrently provide an increased user perceived data rate of the terminal. To satisfy these requirements, improvements of various transmission and reception technologies are required, including a more advanced multi input multi output (MIMO) transmission technology. In addition, while transmitting signals using the maximum 20 megahertz (MHz) transmission bandwidth in the 2 GHz band currently used by the LTE, the 5G communication system uses a frequency bandwidth wider than 20 MHz in the frequency band of 3~6 GHz or 6 GHz or higher, thus satisfying the required data transmission rate in the 5G communication system.

At the same time, the 5G communication system is considering the mMTC to support application services such as Internet of thing (IoT). The mMTC requires large-scale terminal access support in a cell, terminal coverage enhancement, improved battery time, and terminal cost reduction to efficiently provide the IoT. The IoT is attached to various sensors and various devices to provide communication functions and accordingly should be able to support a great number of terminals (e.g., 1,000,000 terminals/km$^2$) in the cell. In addition, the terminal supporting the mMTC is highly likely to be located in a shaded area not covered by the cell such as an underground of building due to service characteristics, and thus requires wider coverage than other services provided by the 5G communication system. The terminals supporting the mMTC should be configured with a low-priced terminal, and requires a quite long battery life time such as 10~15 years because it is difficult to frequently replace the battery of the terminal.

Finally, the URLLC is a cellular-based wireless communication service used for mission-critical purposes. For example, services used for remote control or a robot or machinery, industrial automation, unmanaged aerial vehicle, remote health care, emergency situation, or the like may be considered. Thus, the communication provided by the URLLC should provide very low latency and very high reliability. For example, a service supporting the URLLC should meet air interface latency smaller than 0.5 milliseconds and at the same time has requirements of a packet error rate below $10^{-5}$. Hence, for the service supporting the URLLC, the 5G system should provide a transmit time interval (TTI) smaller than other services, and concurrently requires design issues for allocating a wide resource in the frequency band to secure communication link reliability.

Three services of 5G, that is, the eMBB, the URLLC, and the mMTC may be multiplexed and transmitted in one system. At this time, to satisfy the different requirements of the respective services, different transmission and reception schemes and transmission and reception parameters may be used between the services.

Terms indicating access nodes, terms indicating network entities, terms indicating messages, terms indicating interfaces between network entities, and terms indicating various identification information used in the following descriptions are illustrated only for convenience of description. Accordingly, the disclosure is not limited to the terms to be described, and other terms having the same technical meaning may be used.

Hereinafter, for the sake of explanation, the disclosure uses terms and names which are defined in the LTE and the NR standards, which are the latest standards being defined in the 3GPP group among currently existing communication standards. However, the disclosure is not limited by the terms and names, but may be equally applied to systems conforming to other standards. In particular, the disclosure may be applied to the 3GPP NR (5G mobile communication standard).

In the disclosure, to determine whether a specific condition (or a reference) is fulfilled, expressions such as equal to or greater than or equal to or less than are used but is merely an expression by way of example and does not exclude expressions of greater than or less than. A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

As the frequency band increases in the 5G system (e.g., especially a mmWave band over 6 GHz), coverage may be limited due to propagation path attenuation, if a base station transmits and receives data to and from a terminal. The problem according to the limited coverage may be solved by densely deploying a plurality of relays (or, relay nodes) along a propagation path between the base station and the terminal, but a cost issue for installing an optical cable for backhaul connection between the relay and the relay is worsened. Thus, the cost problem of installing the optical cable may be addressed, and the mmWave band may be more efficiently used, by using broadband radio frequency resources available in the mmWave to transmit and receive the backhaul data between the relays instead of installing the optical cable between the relays.

As described above, the technology for transmitting and receiving the backhaul data from the base station and finally transmitting and receiving access data to the terminal via at least one relaying node is called integrated access and backhaul (IAB), wherein the relay node which transmits and receives data from the base station using the wireless backhaul is referred to as an IAB node. At this time, the base station (or may be referred to as a gNB an IAB donor) includes a central unit (CU) and a distributed unit (DU), and the IAB node includes a DU and a mobile termination (MT). The CU manages a DU of every IAB node connected to the base station across multi-hop.

The IAB node may use different frequency bands or the same frequency band if receiving backhaul data from the base station and transmitting access data to the terminal, and if receiving access data from the terminal and transmitting backhaul data to the base station. If using the same frequency band in the access data reception and the backhaul data transmission or in the access data transmission and the backhaul data reception, the IAB node has a half-duplex constraint at any given moment. Hence, as a method for mitigating transmission or reception delay due to the half-duplex constraint of the IAB node, the IAB node in the signal transmission may multiplex (e.g., frequency division multiplexing (FDM) and/or spatial division multiplexing (SDM)) the backhaul data (e.g., assuming that a parent IAB node, an IAB node serving as the relay node, and a child node are connected in wireless backhaul links, uplink data from the MT of the IAB node to the DU of the parent IAB node and downlink data from the DU of the IAB node to the MT of the child IAB node) and the access data to the terminal (downlink data from the IAB node to the terminal). The parent node and child node relationship of the IAB node may refer to 3GPP specification TS 38.300 section 4.7 Integrated Access and Backhaul.

In the signal reception, the IAB node may multiplex (FDM and/or SDM) the backhaul data (downlink data from the DU of the parent IAB node to the MT of the IAB node and uplink data from the MT of the child IAB node to the DU of the IAB node) and the access data from the terminal (uplink data from the terminal to the IAB node).

At this time, if supporting the multiplexing (the FDM and/or the SDM), the IAB node may support switching between the TDM, the FDM, and the SDM. If the DU and the MT of the IAB node have difficulty in simultaneous transmission and reception using the FDM or the SDM or if the base station or the parent IAB node indicates fallback to a stable multiplexing scheme, the IAB node may transmit and receive data by switching the multiplexing scheme to the TDM. Hereafter, embodiments of the disclosure provide a DU resource type configuration method of the IAB node and its operation of the IAB node, if the multiplexing scheme is switched from the FDM or the SDM to the TDM.

FIG. 1 is a diagram illustrating an example of a wireless communication system in which an IAB node is operated according to an embodiment of the disclosure.

Referring to FIG. 1, a gNB 101 is a typical base station (e.g., an eNB or a gNB), and may be referred to as a gNB, an eNB, a base station, a donor base station or a donor IAB in the disclosure. The IAB donor may indicate an entity which serves an IAB node, to connect the IAB node to a core network (e.g., an evolved packet core (EPC) or a 5 core (5GC)) to be described. The IAB donor, which is a base station, is a network infrastructure which provides a radio access to a terminal. The base station has coverage defined as a specific geographic region based on a signal transmission distance. The term 'coverage' used hereafter may indicate a service coverage area in the gNB 101. The base station may cover one cell, or may cover a plurality of cells. Herein, the plurality of the cells may be distinguished by the supported frequency, or a covered sector area.

The base station serving as the IAB donor may be referred to as, besides the gNB, an 'access point (AP)', an 'eNodeB (eNB)', a '5G node', a '5G nodeB (NB)', a 'next generation node B (gNB)', a 'wireless point', a 'transmission/reception point (TRP)' or other term having the equivalent technical meaning. In distributed deployment, the base station may be referred to as a CU, a DU, a 'digital unit (DU)', a 'radio unit (RU)', a remote radio head (RRH) or other term having the equivalent technical meaning. While the IAB donor is described as one entity, which is the gNB 101 in FIG. 1, it may be implemented with distributed entities, according to an embodiment. For example, the IAB donor may be divided into the CU and the DU to function.

An IAB node #1 111 and an IAB node #2 121 are IAB nodes which transmit and receive signals through backhaul links. The IAB nodes 111 and 121 are network entities for wireless access and backhaul connection, and may be deployed to extend coverage. With the wireless backhaul connection, the coverage of the gNB 101 which is the IAB donor may increase without installing a wired network. For example, the IAB node #1 111 may be disposed near the gNB 101 which is the IAB donor (e.g., within a radio communication radius). The IAB node #1 111 may be connected with the gNB 101 which is the IAB donor in the backhaul link to communicate, and communicate with a second UE 112 in a radio link. The IAB node #2 121 may be disposed near the IAB node #1 111 which is the other node (e.g., within a radio communication radius). The coverage increase may be achieved in the high frequency band (e.g., the mmWave band) through the deployment of each IAB node. Each IAB node may function as the relay technology or a repeater, as well as the multi-hop.

The IAB node may be connected with a parent node and a child node. For example, in terms of the IAB node #1 111, the gNB 101 may be referred to as the parent node, and the IAB node #2 121 or the second UE 112 may be referred to as the child node. In terms of the IAB node #2 121, the IAB node #1 111 may be referred to as the parent node, and a third UE 122 may be referred to as the child node. A link between the IAB node and the parent node is referred to as a parent link, and a link between the IAB node and the child node is referred to as a child link.

The terminal (e.g., a first UE 102, the second UE 112, the third UE 122) is a device used by the user, and communicates with the base station or the IAB node over a radio channel Hereafter, the radio channel between the terminal and the base station or the terminal and the IAB node is referred to as an access link. The terminal may include not only an electronic device used by a general user but also, in some cases, a device which performs machine type communication (MTC) which is operable without user's involvement in the disclosure. The terminal may be referred to as, besides the terminal, a 'UE', a 'mobile station', a 'subscriber station', a 'customer premises equipment (CPE)', a 'remote terminal', a 'wireless terminal', an 'electronic device', a 'vehicle terminal', a 'user device' or other term having the equivalent technical meaning.

The first UE 102 transmits and receives access data to and from the gNB 101 through an access link 103. The IAB node #1 111 transmits and receives backhaul data to and from the gNB 101 through a backhaul link 104. The second UE 112 transmits and receives access data to and from the IAB node #1 111 through an access link 113. The IAB node #2 121 transmits and receives backhaul data to and from the IAB node #111 through a backhaul link 114. Hence, the IAB node #1 111 is an upper IAB node of the IAB node #2 121, and is also referred to as a parent IAB node. The IAB node #2 121 is a lower IAB node of the IAB node #1 111, and is referred to as a child IAB node. The third UE 122 transmits and receives access data to and from the IAB node #2 121 through an access link 123. The backhaul link 104 and 114 in FIG. 1 may use a wireless backhaul link.

Next, measurement of the terminal on the IAB node or the donor gNB will be described.

Coordination between the donor gNB and the IAB nodes may be required, for the second UE 2 112 or the third UE 122 to perform measurement on the donor gNB or the IAB node which is not a serving IAB node but is neighboring. That is, the donor gNB may match a measurement resource of an IAB node having an even hop order, or match a measurement resource of an IAB node having an odd hop order, and thus the terminal may minimize resource waste for performing the measurement of the neighboring IAB node or the IAB base station. The terminal may receive from the serving IAB node or the base station, configuration information for measuring a synchronization signal block (SSB)/physical broadcast channel (PBCH) or a channel state information reference signal (CSI-RS) for the measurement of the neighboring IAB node through higher layer signaling (a higher layer signal, e.g., radio resource control (RRC) signaling). If the terminal receives the configuration to measure the neighboring base station through the SSB/PBCH, the terminal may be configured with at least two SSB/PBCH measurement timing configurations (SMTCs) per frequency for the measurement resource of the IAB node having the even hop order or the measurement resource of the IAB node having the odd hop order. The terminal receiving the configuration information may perform the measurement of the IAB node having the even hop order in one SMTC, and may perform the measurement of the IAB node having the odd hop order in another SMTC.

Next, measurement of the IAB node or donor gNBs on another IAB node will be described.

Coordination between the donor gNB and the IAB nodes may be required, for one IAB node to perform the measurement on the donor gNB or the IAB node which is in another neighborhood. That is, the donor gNB may match a measurement resource of an IAB node having an even hop order, or match a measurement resource of an IAB node having an odd hop order, thus minimizing resource waste for performing the measurement of the IAB node on the neighboring IAB node or the IAB base station. The one IAB node may receive from the serving IAB node or the base station, configuration information for measuring the SSB/PBCH or the CSI-RS for the measurement of the neighboring IAB node through higher layer signaling (e.g., RRC signaling). If the IAB node receives the configuration to measure the neighboring base station through the SSB/PBCH (may be referred to as a "synchronization signal block"), the IAB node may be configured with at least two SMTCs per frequency for the measurement resource of the IAB node having the even hop order or the measurement resource of the IAB node having the odd hop order. The IAB node receiving the configuration may perform the measurement of the IAB node having the even hop order in one SMTC, and may perform the measurement of the IAB node having the odd hop order in another SMTC.

Next, multiplexing the backhaul link between the base station and the IAB node or between an IAB node and an IAB node and the access link between the base station and the terminal or between the IAB node and the terminal within radio resources in the IAB technology proposed in the disclosure shall be described in more detail with reference to FIGS. 2, 3A, 3B, 4A, and 4B.

Figure 2:
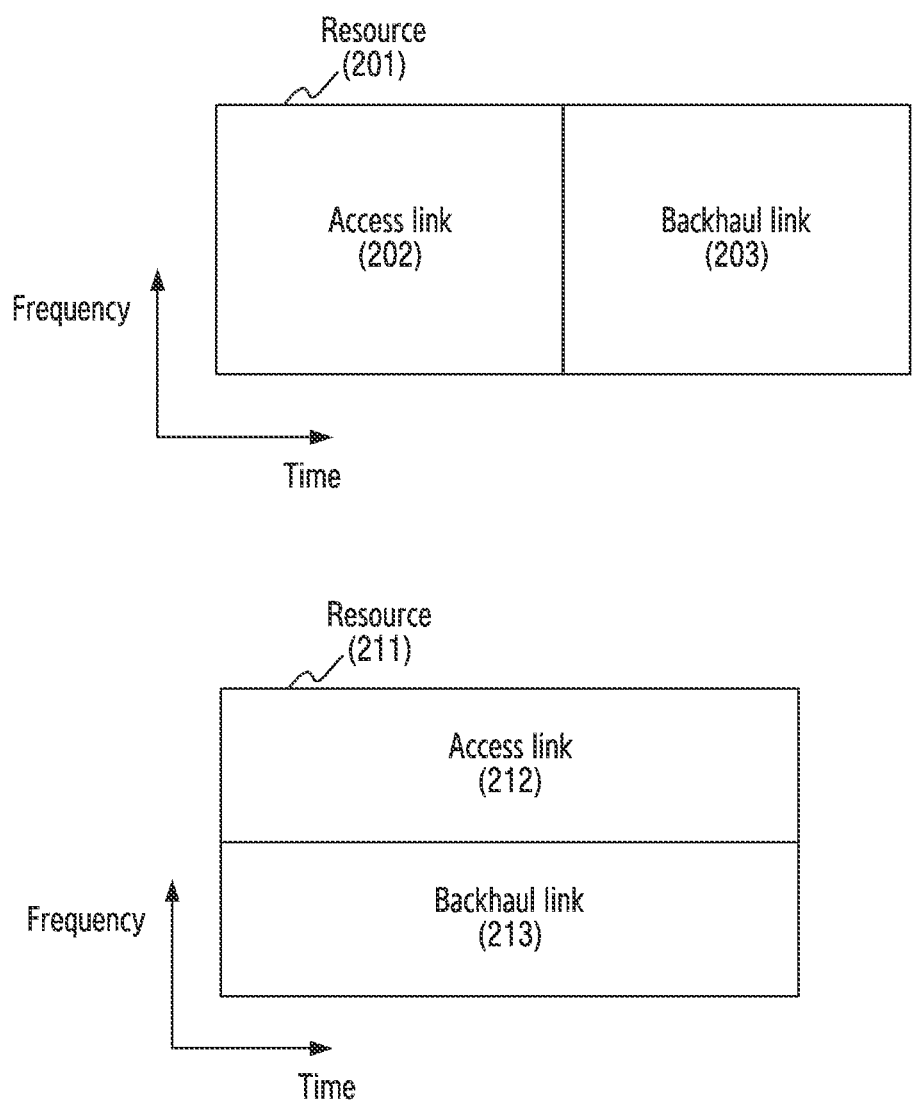
FIG. 2 is diagram schematically illustrating an example of multiplexing resources in a time domain and a frequency domain between an access link and a backhaul link of an IAB node according to an embodiment of the disclosure.

FIG. 2 is diagram schematically illustrating an example of multiplexing resources between an access link and a backhaul link at an IAB according to an embodiment of the disclosure.

Referring to FIG. 2, it illustrates the example that resources are multiplexed in a time domain between the access link and the backhaul link at the IAB node. FIG. 2 illustrates the example that resources are multiplexed in a frequency domain between the access link and the backhaul link at the IAB node.

FIG. 2 shows the example that a backhaul link 203 between the base station and the IAB node or between the IAB node and the IAB node and an access link 202 between the base station and the terminal or between the IAB node and the terminal are time-division multiplexed (TDM) in a radio resource 201. Accordingly, as shown in FIG. 2, if the resources are multiplexed in the time domain between the access link and the backhaul link at the IAB node, data is not transmitted or received between the base station and the IAB nodes in the time domain where the base station or the IAB node transmits and receives data to and from the terminal. In addition, if the resources are multiplexed in the time domain between the access link and the backhaul link at the IAB node, the base station or the IAB node does not transmit and receive data to and from the terminal in the time domain where data is transmitted and received between the base station or the IAB nodes.

Next, FIG. 2 shows the example that a backhaul link 213 between the base station and the IAB node or between the IAB node and the IAB node and an access link 212 between the base station and the terminal or between the IAB node and the terminal are frequency-division multiplexed (FDM) in a radio resource 211. Hence, data may be transmitted or received between the base station and the IAB nodes in the time domain where the base station or the IAB node transmits and receives data to and from the terminal. However, only data transmissions of the same direction are possible due to the half-duplex constraint of the IAB nodes. For example, in the time domain where a first IAB node receives data from the terminal, the first IAB node may only receive backhaul data from another IAB node or the base station. In addition, the first IAB node may only transmit backhaul data to another IAB node or the base station in the time domain where the first IAB node transmits data to the terminal.

While only the TDM and the FDM of the multiplexing schemes have been described in FIG. 2, the SDM between the access link and the backhaul link is possible. Hence, the access link and the backhaul link may be transmitted and received through the SDM at the same time, but only data transmissions of the same direction are possible in the SDM due to the half-duplex constraint of the IAB nodes of FIG. 2. For example, in the time domain where the first IAB node receives data from the terminal, the first IAB node may only receive backhaul data from another IAB node or the base station. In addition, in the time domain where the first IAB node transmits data to the terminal, the first IAB node may only transmit backhaul data to another IAB node or to the base station.

Information of the multiplexing scheme to use among the TDM, the FDM, and the SDM may be delivered between the 'JAB node' and the 'base station or the upper IAB node' in various manners. According to embodiments, if the IAB node initially accesses the base station or the upper IAB node, the IAB node may transmit capability information of the multiplexing scheme to the base station or the upper IAB node (e.g., a parent IAB node). Alternatively, according to embodiments, the IAB node may receive the information of the multiplexing scheme to use from the corresponding base station or upper IAB nodes through higher layer signaling information (a higher layer signal) such as system information, RRC information or medium access control (MAC) control element (CE). Alternatively, according to embodiments, the IAB node may receive the information of the multiplexing scheme to use from the base station or the upper IAB nodes through the backhaul link after the initial access. Alternatively, according to embodiments, which multiplexing scheme is to be used after the IAB node transmits the capability information to the base station or the upper IAB node may be implementation of the IAB node, and which multiplexing scheme is to be used in a specific slot or radio frame, a specific duration, or continuously may be reported to the base station or the upper IAB nodes through higher layer signaling information.

While the examples of FIG. 2 have described mainly the multiplexing scheme between the access link and the backhaul link, multiplexing between the backhaul link and the backhaul link may also use the same scheme as the multiplexing between the access link and the backhaul link. For example, multiplexing a 'backhaul link' of an MT and a 'backhaul link or an access link' of a DU in one IAB node to be described is enabled by the manner explained in the examples of FIG. 2.

Figure 3A:
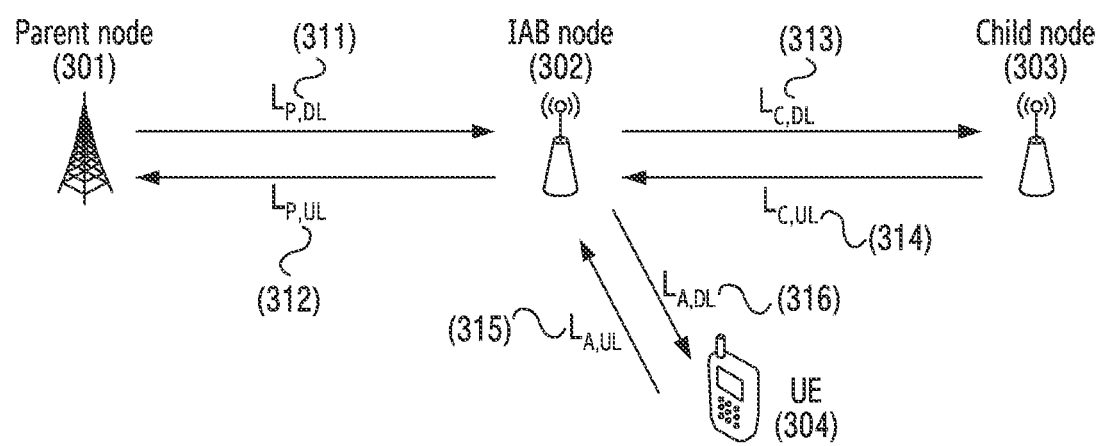
FIGS. 3A and 3B are diagrams illustrating an example of multiplexing resources in a time domain between an access link and a backhaul link at an IAB node according to various embodiments of the disclosure.
Figure 3B:
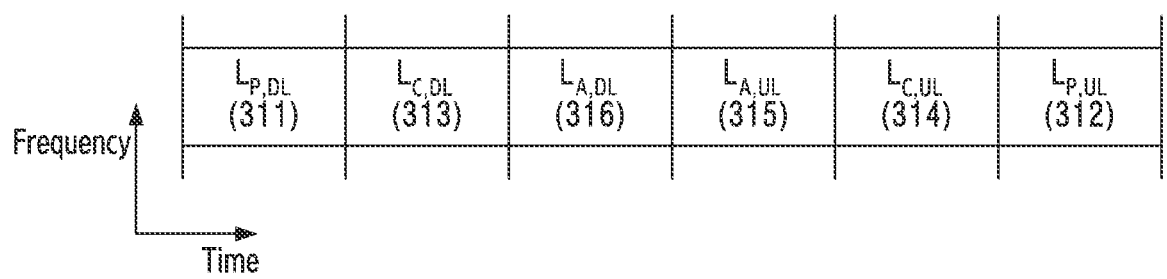

FIGS. 3A and 3B are diagrams illustrating an example of multiplexing resources in a time domain between an access link and a backhaul link at an IAB node according to various embodiments of the disclosure.

Referring to FIG. 3A, it illustrates that an IAB node 302 communicates with a parent IAB node 301, a child IAB node 303, and a UE 304. In a more detailed description of links between the nodes, the parent IAB node 301 transmits a backhaul downlink signal to the IAB node 302 in a backhaul downlink 311 $L_{P,DL}$, and the IAB node 302 transmits a backhaul uplink signal to the parent IAB node 301 in a backhaul uplink 312 $L_{P,UL}$. The IAB node 302 transmits an access downlink signal to the UE 304 in an access downlink 316 $L_{A,DL}$, and the UE 304 transmits an access uplink signal to the IAB node 302 in an access uplink 315 $L_{A,UL}$. The IAB node 302 transmits a backhaul downlink signal to the child IAB node 303 in a backhaul downlink 313 $L_{C,DL}$, and the child IAB node 303 transmits a backhaul uplink signal to the IAB node 302 in a backhaul uplink 314 $L_{C,UL}$. In the example of FIG. 3A, the subscript P denotes the backhaul link with the parent, the subscript A denotes the access link with the UE, and the subscript C denotes the backhaul link with the child.

The link relationship of FIG. 3A is described based on the IAB node 302, and the parent node is the IAB node 302 in terms of the child IAB node 303, and the child IAB node 303 may have another lower child IAB node. In addition, a child node is the IAB node 302 in terms of the parent IAB node 301, and the parent IAB node 301 may have another upper parent IAB node.

The backhaul uplink or the downlink signal and the access uplink or the downlink signal may include at least one of data and control information, a channel for transmitting data and control information, a reference signal required to decode data and control information, or reference signals for obtaining channel information.

Referring to FIG. 3B, it illustrates the example that the above links are all multiplexed in the time domain. In the example of FIG. 3A, the backhaul downlink $L_{P,DL}$ 311, the backhaul downlink $L_{C,DL}$ 313, the access downlink $L_{A,DL}$ 316, the access uplink $L_{A,UL}$ 315, the backhaul uplink $L_{C,UL}$ 314, and the backhaul uplink $L_{P,UL}$ 312 are multiplexed based on time. The relationship between the links provided in the example of FIG. 3B is an example, and any other relationship may be applied.

Since the above links are multiplexed based on the time in the time domain, it is noted that this time division is the multiplexing scheme which takes the most time to transmit a signal from the parent IAB node 301 to the child IAB node 303 via the IAB node 302, and to the UE. Thus, a method for mitigating latency if finally transmitting the signal from the parent IAB node 301 to the UE may consider a method of multiplexing a backhaul link and a backhaul link or a backhaul link and access links in the frequency domain or in a spatial domain and transmitting them at the same time.

Figure 4A:
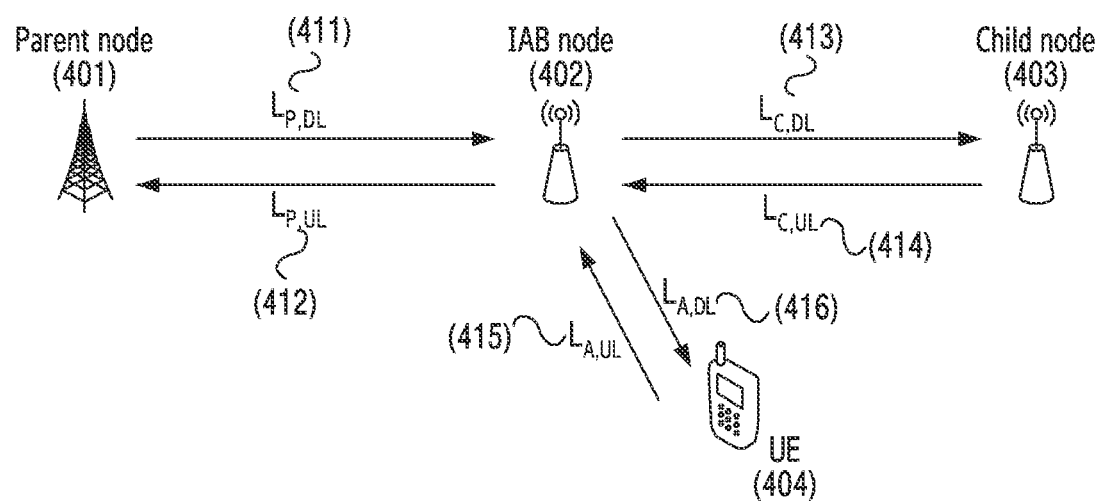
FIGS. 4A and 4B are diagrams illustrating an example of multiplexing resources in frequency and spatial domains between an access link and a backhaul link at an IAB node according to various embodiments of the disclosure.
Figure 4B:
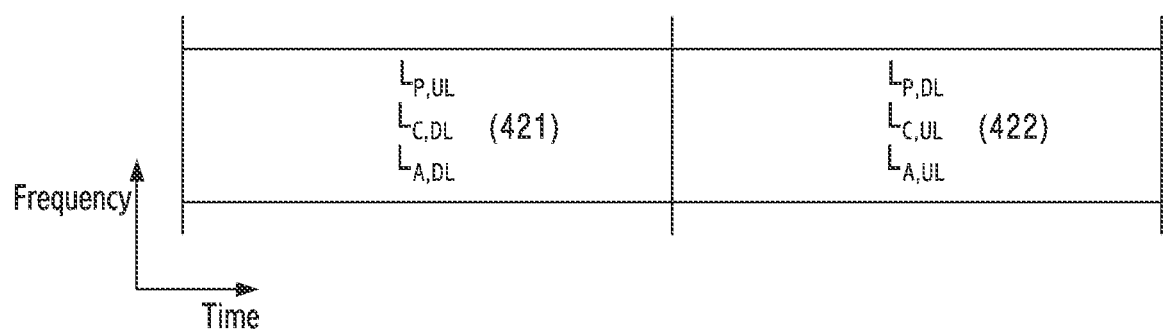

FIGS. 4A and 4B illustrate examples of multiplexing resources in frequency and spatial domains between an access link and a backhaul link at an IAB according to various embodiments of the disclosure. FIGS. 4A and 4B illustrate a method for mitigating time latency by multiplexing a backhaul link and a backhaul link or a backhaul link and access links in the frequency domain or the spatial domain.

Referring to FIG. 4A, it illustrates that an IAB node 402 communicates with a parent node 401, a child IAB node 403, and a UE 404 similarly to FIG. 3A. In a more detailed description of links between the nodes, the parent node 401 transmits a backhaul downlink signal to the IAB node 402 in a backhaul downlink $L_{P,DL}$ 411, and the IAB node 402 transmits a backhaul uplink signal to the parent node 401 in a backhaul uplink $L_{P,UL}$ 412. The IAB node 402 transmits an access downlink signal to the UE 404 in an access downlink $L_{A,DL}$ 416, and the UE 404 transmits an access uplink signal to the IAB node 402 in an access uplink $L_{A,UL}$ 415. The IAB node 402 transmits a backhaul downlink signal to the child IAB node 403 in a backhaul downlink $L_{C,DL}$ 413, and the child IAB node 403 transmits a backhaul uplink signal to the IAB node 402 in a backhaul uplink $L_{C,UL}$ 414. In the above example of FIG. 4A, the subscript P denotes a backhaul link with a parent, the subscript A denotes an access link with a UE, and the subscript C denotes a backhaul link with a child.

This link relationship of FIG. 4A is described based on the IAB node 402, and in the view of the child IAB node 403, its parent node is the IAB node 402 and the child IAB node 403 may have another lower child IAB node. In addition, in the view of the parent node 401, its child node is the IAB node 402 and the parent node 401 may have another upper parent IAB node.

The backhaul uplink or the downlink signal and the access uplink or the downlink signal may include at least one of data and control information, a channel for transmitting data and control information, a reference signal required to decode data and control information, or reference signals for obtaining channel information.

Referring to FIG. 4B, it illustrates the example of the multiplexing in the frequency domain or the spatial domain. As explained above, since the IAB node has the half-duplex constraint at any given moment, signals which may be multiplexed in the frequency domain or the spatial domain are limited. For example, considering the half-duplex constraint of the IAB node 402, links which may be multiplexed in the time domain where the IAB node may perform transmission may include the backhaul uplink $L_{P,UL}$ 412, the backhaul downlink $L_{C,DL}$ 413, and the access downlink $L_{A,DL}$ 416. Hence, if multiplexing the links (i.e., the backhaul uplink $L_{P,UL}$ 412, the backhaul downlink $L_{C,DL}$ 413, and the access downlink $L_{A,DL}$ 416) in the frequency domain or in the spatial domain, the IAB node 402 may transmit all the links in the same time domain as shown in a resource region 421. In addition, links which may be multiplexed in the time domain where the IAB node may perform reception may include the backhaul downlink $L_{P,DL}$ 411, the backhaul uplink $L_{C,UL}$ 414, and the access uplink $L_{A,UL}$ 415. Accordingly, if multiplexing the links (i.e., the backhaul downlink $L_{P,DL}$ 411, the backhaul uplink $L_{C,UL}$ 414, and the access uplink $L_{A,UL}$ 415) in the frequency domain or the spatial domain, the IAB node 402 may receive all the links in the same time domain as shown in a resource region 422.

The multiplexing of the links provided in the embodiment of FIG. 4B is an example, and it is noted that only two of the three links multiplexed in the frequency or spatial domain may be multiplexed. That is, the IAB node may transmit or receive a signal by multiplexing some of the multiplexable links.

Next, a structure of the IAB node shall be explained.

The 5G system is studying various base station structures which are optimal for service requirements to support various services such as large-capacity transmission, low-latency, high-reliability or large-volume IoT devices, and to reduce communication network installation cost (capital expenditure (CAPEX)). The fourth generation (4G) LTE system has commercialized a cloud radio access network (C-RAN) structure in which a data processor and a wireless transceiver (or an RRH) of the base station are split, the data processor is processed at the center, and only the wireless transceiver is placed at a cell site to reduce the CAPEX and to effectively process interference control. If transmitting baseband digital in-phase quadrature (IQ) data from the base station data processor to the wireless transceiver, the C-RAN structure generally uses an optical link of common public radio interface (CPRI) standard. A considerable data capacity is required in transmitting data to the wireless transceiver. For example, 614.4 Mbps is required to transmit 10 MHz Internet protocol (IP) data, and 1.2 Gbps data transmission rate is required to transmit 20 MHz IP data. Hence, the 5G RAN structure is designed in various structures by splitting the base station into a CU and a DU to reduce enormous load of the optical link, and applying functional split to the CU and the DU. The 3GPP is working on standardization of various functional split options between the CU and the DU, and the options for the functional split include 8 options in total from an option 1 to an option 8 by splitting the functions between protocol layers or within a protocol layer, wherein the option 2 and the option 7 are considered first in the current 5G base station structure. The option 2 includes the RRC and packet data convergence protocol (PDCP) in the CU, and includes radio link control (RLC), MAC, a physical layer (PHY) and radio frequency (RF) in the DU. The option 7 includes the RRC, the PDCP, the RLC, the MAC, and the upper physical layer in the CU, and includes the lower physical layer in the DU. It is possible to have a structure having deployment flexibility which separates and moves the NR network protocols between the CU and the DU through the functional split as above. Through this structure, flexible hardware implementation provides a cost-efficient solution, the split structure between the CU and the DU enables adjustment of load management and real-time performance optimizations, and network functions virtualization (NFV)/software-defined networking (SDN), and the configurable functional split has an advantage of applicability to various applications (variable latency on transmission). Hence, the structure of the IAB node considering the function split will be described with FIG. 5.

Figure 5:
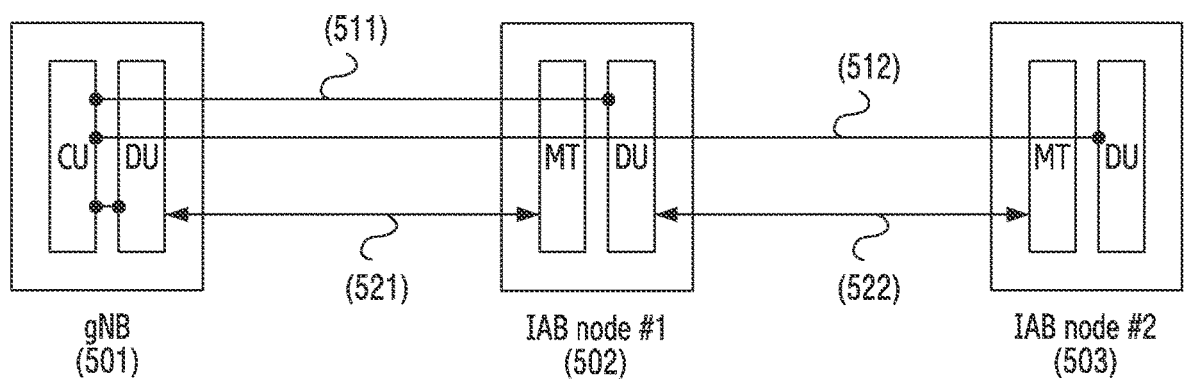
FIG. 5 is diagram schematically illustrating a structure of an IAB node according to an embodiment of the disclosure.

FIG. 5 schematically illustrates a structure of an IAB node according to an embodiment of the disclosure.

Referring to FIG. 5, a gNB 501 includes a CU and a DU, and IAB nodes include a terminal function (hereafter, an MT) for transmitting and receiving data to and from a parent node in a backhaul link, and a base station function (hereafter, a DU) for transmitting and receiving data to and from a child node in a backhaul link. In FIG. 5, an IAB node #1 502 is wirelessly connected to the gNB 501 across one hop, and an IAB node #2 503 is wirelessly connected to the gNB 501 across two hops via the IAB node #1 502.

Referring to FIG. 5, the CU of the gNB 501 may control 511 and 512 not only the DU of the gNB 501 but also all IAB nodes wirelessly connected to the gNB 501, that is, the DUs of the IAB node #1 502 and the IAB node #2 503. The CU of the gNB 501 may allocate radio resources to the DU to allow the DU to transmit and receive data to and from the MT of the lower IAB node. The radio resource allocation may be transmitted to the DU through a higher layer signal such as system information or RRC information or a physical signal using an F1 application protocol (F1AP) interface. The F1AP may refer to 3GPP TS 38.473 specification. In this case, the radio resource for the TDM as the multiplexing scheme may include a downlink time resource, an uplink time resource, a flexible time resource, and so on. In each IAB node, the radio resource is configured through the CU of the base station (i.e., the IAB donor), and scheduling may be performed in the DU of the IAB node. The MT of the lower IAB node or the UE may transmit and receive data according to the scheduling.

Hereinafter, radio resource configuration for the TDM shall be described in detail based on the IAB node #2 503. In particular, the radio resource configuration according to embodiments of the disclosure may be applied if the resources are multiplexed within one carrier in the time domain between the access link and the backhaul link at the IAB node, in FIG. 3A. In addition, the radio resource configuration according to embodiments of the disclosure may be applied if the backhaul link and the backhaul link or the backhaul link and the access links are multiplexed in the frequency domain of different carriers in FIG. 4A.

The downlink time resource is a resource for the DU of the IAB node #2 503 to transmit downlink control/data and signal to the MT of the IAB node. The uplink time resource is a resource for the DU of the IAB node #2 503 to receive uplink control/data and signal from the MT of the lower IAB node. The flexible time resource is a resource which may be used by the DU as a downlink time resource or an uplink time resource, and how to use the flexible time resource may be indicated to the MT of the lower IAB node by the downlink control signal of the DU. The MT of the lower IAB node receiving the downlink control signal determines whether the flexible time resource is to be used as a downlink time resource or an uplink time resource. If the downlink control signal is not received, the MT of the lower IAB node does not perform the transmission/reception operation. That is, the MT does not monitor or decode a downlink control channel in the resource, or does not measure a signal in the resource. The MT performs no transmission/reception operation in the resource. That is, the MT does not monitor or decode the downlink control channel in the resource, or does not measure a signal in the resource. With respect to the downlink time resource, the uplink time resource, and the flexible time resource, two different types (or three different types including a time resource always unavailable) may be indicated from the CU to the DU.

The first type is a soft type, and the CU of the gNB 501 may configure soft-type downlink time resource, uplink time resource, and flexible time resource to the DU of the IAB node #2 503 using the F1AP (the interface between the CU and the DU). In this case, for the configured soft-type resources, the IAB node #1 which is a parent IAB (or a DU of the parent IAB) of the IAB node #2 503 may explicitly (e.g., by a downlink control information (DCI) format) or implicitly indicate whether the resource is available or not available to the IAB node #2 503 which is a child IAB (or a DU of the child IAB). That is, if it is indicated that a specific resource is available, the DU of the IAB node #2 503 may utilize the resource for data transmission or reception with the MT of the lower IAB node. That is, using the resource, the DU of the IAB node #2 503 may perform the transmission with the downlink resource or the reception with the uplink resource. If it is indicated that the resources are not available, the IAB node #2 503 may not use the resource for the data transmission or reception with the MT of the lower IAB node. That is, the DU of the IAB node #2 503 may transmit or receive using the resource.

A method for indicating the availability of the soft-type resource with the DCI format shall be described in more detail. In this embodiment, the DCI may include an availability indicator for indicating availability of one or more consecutive uplink, downlink, or flexible symbols.

To receive the DCI according to the DCI format, the IAB node #2 503 may receive information of at least one or more of location information of the availability indicator indicating the availability of the IAB node #2 in the DCI format, a table indicating the availability of time resources corresponding to a plurality of slots, and mapping relations of the availability indicator, together with a cell ID of the DU of the IAB node #2 503 in advance, by a higher layer signal from the CU or the parent IAB. A value (or an indicator) indicating the availability of the consecutive uplink symbol, downlink symbol, or flexible symbol within one slot, and meaning of the value (or the indicator), may be configured as shown in Table 1 below.

TABLE 1

| Value | Indication |
|---|---|
| 0 | No indication of availability for soft symbols |
| 1 | DL soft symbols are indicated available<br>No indication of availability for<br>UL and Flexible soft symbols |

TABLE 1-continued

| Value | Indication |
|---|---|
| 2 | UL soft symbols are indicated available<br>No indication of availability for DL and Flexible soft symbols |
| 3 | DL and UL soft symbols are indicated available<br>No indication of availability for Flexible soft symbols |
| 4 | Flexible soft symbols are indicated available<br>No indication of availability for DL and UL soft symbols |
| 5 | DL and Flexible soft symbols are indicated available<br>No indication of availability for UL soft symbols |
| 6 | UL and Flexible soft symbols are indicated available<br>No indication of availability for DL soft symbols |
| 7 | DL, UL, and Flexible soft symbols are indicated available |

The second type is a hard type and the resources are always utilized between the DU and the MT. That is, the DU of the IAB node #2 may perform the transmission regardless of the transmission or reception operation of the MT of the IAB node #2 if the resource is a downlink time resource, and may perform the reception if the resource is an uplink resource. If the resource is a flexible resource, the transmission or the reception may be performed by the determination of the IAB DU (i.e., to match the DCI format indicating whether the flexible resource is the downlink resource or the uplink resource, to the MT of the lower IAB node).

The third type is a type always unavailable (always not used or always non-available), and the resources may not be utilized by the DU of the IAB node #2 for the data transmission and reception with the MT.

The above types are received together if the downlink time resource, the uplink time resource, the flexible time resource, and a reserved time resource are received with a higher layer signal from the CU to the DU.

Referring to FIG. 5, the DU of the gNB 501 performs typical base station operations, and the DU controls the MT of the IAB node #1 502 to perform the scheduling to transmit and receive data 521. The DU of the IAB node #1 502 performs typical base station operations, and the DU controls the MT of the IAB node #2 503 to perform the scheduling to transmit and receive data 522.

The DU may indicate the radio resource to transmit and receive data to and from the MT of the lower IAB node based on the radio resources allocated from the CU. The radio resource configuration may be transmitted to the MT through system information, a higher-layer signal or a physical signal. In so doing, the radio resource may include a downlink time resource, an uplink time resource, a flexible time resource, and a reserved time resource. The downlink time resource is a resource for the DU to transmit downlink control/data and signal to the MT of the lower IAB node. The uplink time resource is a resource for the DU to receive uplink control/data and signal from the MT of the lower IAB node. The flexible time resource is a resource available to the DU for the downlink time resource or the uplink time resource, and how to use the flexible time resource may be indicated to the MT of the lower IAB node by the downlink control signal of the DU. The MT receiving the downlink control signal determines whether the flexible time resource is to be used as the downlink time resource or the uplink time resource. If the downlink control signal is not received, the MT does not perform the transmission or reception operation. That is, the MT does not monitor or decode a downlink control channel in the resource, or does not measure a signal in the resource.

The downlink control signal is signaled to the MT in combination of a higher layer signal and a physical signal, and the MT may determine a slot format of a specific slot by receiving the signaling. The slot format may be basically configured to start with a downlink symbol, to place a flexible symbol in the middle, and to end with an uplink symbol (e.g., a structure in order of downlink (D)-flexible (F)-uplink (U)). If using the slot format alone, the DU of the IAB node may perform downlink transmission at the beginning of the slot, but the MT of the IAB node is configured in the above slot format (i.e., the DFU structure) from the parent IAB and accordingly may not perform uplink transmission at the same time (corresponding to slot format indexes 0~55 in the following Table 2). Hence, the slot format configured to start with the uplink symbol, to place the flexible symbol in the middle, and to end with the downlink symbol may be illustrated as shown in Table 2 (corresponding to slot format indexes 56~82 in the following Table 2). The slot format illustrated in Table 2 may be transmitted to the MT using the downlink control signal. The slot format illustrated in Table 2 may be configured from the CU to the DU using the F1AP.

TABLE 2

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | F | F | F | F | F |
| 7 | D | D | D | D | D | D | D | F | F | F | F | F | F | U |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | F | U | U | U |
| 32 | D | D | D | D | D | D | D | D | D | F | F | U | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | D | D | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |

TABLE 2-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | F | F | F | F | F | F |
| 61 | U | U | U | U | U | U | U | F | F | F | F | F | F | F |
| 62 | U | U | U | U | U | U | F | F | F | F | F | F | F | F |
| 63 | U | U | U | U | U | F | F | F | F | F | F | F | F | F |
| 64 | U | U | U | U | F | F | F | F | F | F | F | F | F | F |
| 65 | U | U | U | F | F | F | F | F | F | F | F | F | F | F |
| 66 | U | U | F | F | F | F | F | F | F | F | F | F | F | F |
| 67 | U | U | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | F | D |
| 81 | U | U | U | U | U | U | U | U | U | U | F | D | D | D |
| 82 | U | U | U | U | U | U | U | U | U | F | F | D | D | D |
| 83 | U | U | U | U | U | U | U | U | F | F | F | D | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | U | F | F | F | F | F | D |
| 94 | U | U | U | U | U | F | F | F | F | F | F | D | D | D |
| 95 | U | U | U | U | U | F | F | D | D | D | D | D | D | D |
| 96 | U | U | U | U | U | U | D | D | D | D | D | D | D | D |

The reserved time resource (e.g., from 97 to 254) is a resource in which the UD may not transmit or receive data to and from the lower MT, and the MT does not perform the transmission or reception operation in the resource. That is, the MT does not monitor or decode the downlink control channel in the resource, or does not measure a signal in the resource.

Hence, the MT in one IAB node is controlled by DUs of the upper IAB nodes to receive scheduling and transmit and receive data, and the DUs of the same IAB nodes are controlled by the CU of the gNB 501. Thus, it difficult to coordinate in real time because the MT and DU in one IAB are controlled by different subjects.

Figure 6:
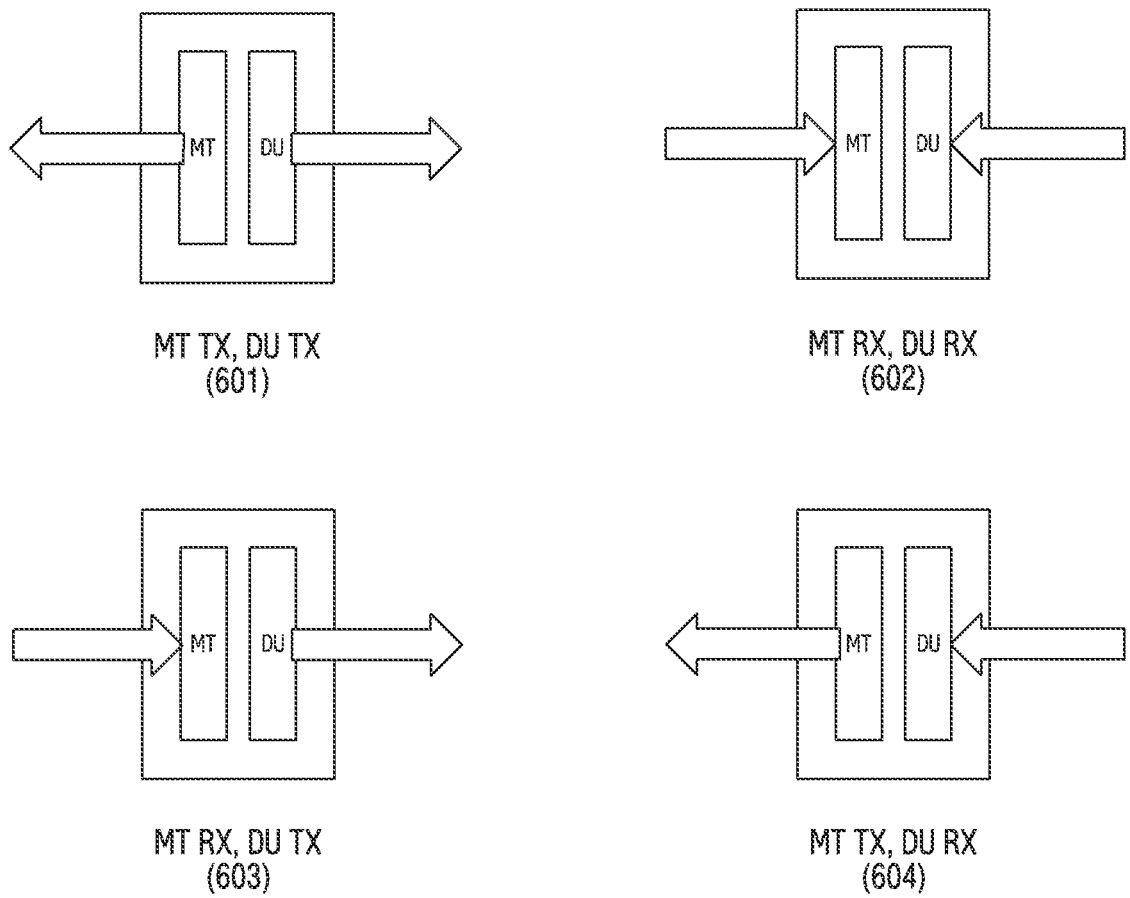
FIG. 6 is diagram for explaining a communication method for simultaneous transmission and reception between a mobile termination (MT) and a distributed unit (DU) in an IAB node in a wireless communication system according to an embodiment of the disclosure.

FIG. 6 is diagram for explaining a communication method for simultaneous transmission or reception between an MT and a DU of an IAB node in a wireless communication system according to an embodiment of the disclosure. In FIG. 6, the simultaneous transmission and reception between the MT and the DU in one IAB node indicates that the MT transmits or receives data and concurrently the DU transmits or receives data within the same time resource, using the multiplexing scheme (the FDM or the SDM) explained in FIG. 2 or to be described in FIG. 7.

Referring to FIG. 6, a first case 601 illustrates that the MT and the DU in one IAB node each transmit a signal. In the first case 601, the signal transmitted by the MT of the IAB node may be received at the parent IAB node or the DU of the base station through the backhaul uplink as explained in FIGS. 3A, 3B, 4A, 4B, and 5. In the first case 601, the signal transmitted by the DU of the IAB node at the same time (i.e., in the same time resource) may be received by the MT of the child IAB node through the backhaul downlink or by the access UE through the access downlink as explained in FIGS. 3A, 3B, 4A, 4B, and 5.

A second case 602 illustrates that the MT and the DU in one IAB node each receive a signal. In the second case 602, the signal received by the MT of the IAB node may be transmitted from the parent IAB node or the DU of the base station through the backhaul downlink as explained in FIGS. 3A, 3B, 4A, 4B, and 5. In the second case 602, the signal received by the DU of the IAB node at the same time (i.e., in the same time resource) may be transmitted by the MT of the child IAB node through the backhaul uplink or by the access UE through the access uplink as explained in FIGS. 3A, 3B, 4A, 4B, and 5.

A third case 603 illustrates that the MT and the DU in one IAB node each receive or transmit a signal. That is, in the third case 603, the MT in the IAB node may receive its signal, and the DU in the IAB node may transmit its signal at the same time. In the third case 603, the signal received by the MT of the IAB node may be transmitted from the parent IAB node or the DU of the base station through the backhaul downlink as explained in FIGS. 3A, 3B, 4A, 4B, and 5. In the third case 603, the signal transmitted by the DU of the IAB node at the same time (i.e., in the same time resource) may be received by the MT of the child IAB node through the backhaul downlink or by the access UE through the access downlink as explained in FIGS. 3A, 3B, 4A, 4B, and 5.

A fourth case 604 illustrates that the MT and the DU in one IAB node each transmit or receive a signal. That is, in the fourth case 604, the MT in the IAB node may transmit its signal, and the DU in the IAB node may receive its signal at the same time. In the fourth case 604, the signal transmitted by the MT of the IAB node may be received by the parent IAB node or the DU of the base station through the backhaul uplink as explained in FIGS. 3A, 3B, 4A, 4B, and 5. In the fourth case 604, the signal received at the DU of the IAB node at the same time (i.e., in the same time resource) may be transmitted by the MT of the child IAB node through the backhaul link or by the access UE through the access uplink as explained in FIGS. 3A, 3B, 4A, 4B, and 5.

The disclosure provides embodiments a DU resource type configuration method and its procedures of the parent IAB node and the IAB node if the MT and the DU in one IAB node each transmit or receive the signal in the first case 601 and the second case 602. The embodiments provided below may be applied to not only the first case 601 and the second case 602 but also the third case 603 and the fourth case 604.

Figure 7:
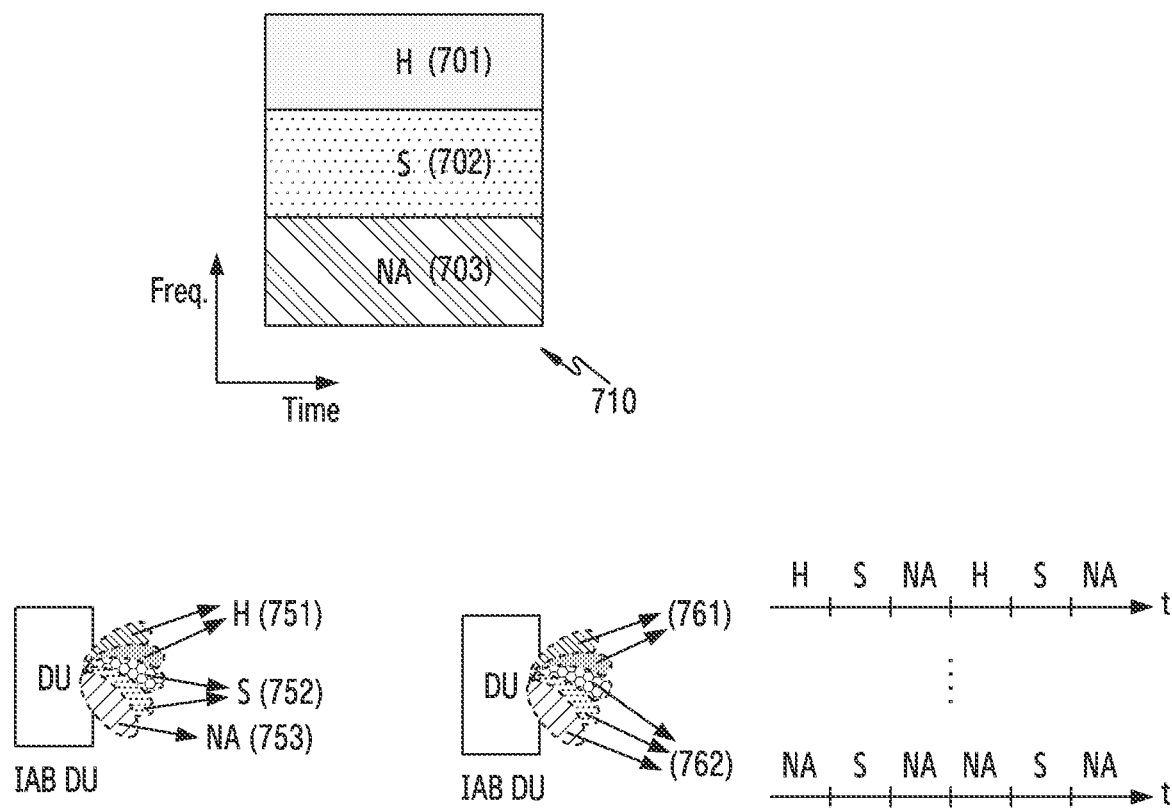
FIG. 7 is diagram for explaining DU resource types for supporting frequency division multiplexing (FDM) and DU resource types for supporting spatial division multiplexing (SDM) at an IAB node in a wireless communication system according to an embodiment of the disclosure.

FIG. 7 is diagram for explaining DU resource types for supporting FDM and DU resource types for supporting SDM in a wireless communication system according to an embodiment of the disclosure.

Referring to FIG. 7, resource allocation 710 indicates that resources based on the resource type are frequency-multiplexed. If the resources of the DU and the MT of the IAB node are multiplexed with the FDM using the resource allocation 710, a DU resource type configuration in the frequency-time domain, and DU and MT operations of the IAB node based on the DU resource type are described first.

The CU of the gNB may allocate a radio resource to the DU to allow the DU to transmit and receive data to and from the MT of its lower IAB node. The radio resource allocation may be transmitted to the DU through a higher layer signal such as system information or RRC information or a physical layer signal using the F1AP interface. In so doing, the radio resource may include a downlink frequency-time resource, an uplink frequency-time resource, and a flexible frequency-time resource. Unlike the radio time resource using the whole band of one carrier as described in FIG. 5, the resources may be configured in the frequency-time domain which is a specific frequency (e.g., at least one or more physical resource blocks (PRBs) or a frequency region configured by allocating at least one or more PRBs on the frequency) and a specific time (e.g., at least one or more slots) within one carrier. Hereafter, the frequency-time shall be omitted in the resource for the sake of convenience. With respect to the downlink resource, the uplink resource, and the flexible resource similarly to the description in the radio time resource, information of the three types (or at least one of the three types) may be indicated from the CU to the DU of the IAB node. The first type is a soft type 702, and the CU of the gNB may configure soft-type downlink resource, uplink resource, and flexible resource to the DU of the IAB node using the F1AP interface (the interface between the CU and the DU). At this time, for the configured soft-type resources, the IAB node which is the parent IAB node (or the DU of the parent IAB) of the IAB node may explicitly (e.g., by the DCI format) or implicitly indicate to the IAB node which is the child IAB node (or the DU of the child IAB) whether the resource is available or not available. That is, if a specific resource is indicated available, the DU of the IAB node may use the resource for the data transmission and reception with the MT of the lower IAB node. That is, using the resource, the DU of the IAB node may perform the transmission with the downlink resource and perform the reception with the uplink resource. If the resource is indicated unavailable, the IAB node may not use the resource for the data transmission and reception with the MT of the lower IAB node. That is, using the resource, the DU of the IAB node may perform the transmission or the reception.

A method for indicating the availability of the soft-type resource with the DCI format is described in further detail. The DCI format in this embodiment may include an availability indicator for indicating the availability of one or more consecutive uplink, downlink, or flexible symbols.

To receive the DCI format, the IAB node may receive information of at least one or more of location information of the availability indicator indicating the availability of the IAB node in the DCI format, a table indicating the availability of resources corresponding to a plurality of slots, and a mapping relation of the availability indicator, along with a cell ID of the DU of the IAB node in advance, by a higher layer signal from the CU or the parent IAB.

The second type is a hard type 701, and the resources of the hard type 701 are always utilized between the DU and the MT. That is, the DU of the IAB node may perform the transmission regardless of the transmission or reception operation of the MT of the IAB node if the resource is the downlink time resource, and may perform the reception if the resource is the uplink resource. If the resource is the flexible resource, the transmission or the reception may be performed by the determination of the IAB DU (i.e., to match the DCI format indicating whether the flexible resource is a downlink resource or an uplink resource to the MT of the lower IAB node).

The third type is an always not used or always non-available (NA) type 703, and resources of the corresponding type may not be utilized by the DU of the IAB node for the data transmission and reception with the MT.

Information of the types may be received together if a downlink resource, an uplink resource, a flexible resource, or a reserved source are received from the CU to the DU with a higher signal.

If the resources of the DU and the MT of the IAB node are multiplexed using the FDM, transmission and reception interference may occur between the DU and the MT of the IAB node because the DU and the MT of the IAB node simultaneously transmit and receive data in adjacent frequency resources at the same time. In this case, a guard frequency region for mitigating the transmission and reception interference may be configured by the IAB node or the base station or the parent IAB node within the DU resource type. According to embodiments of the disclosure, information of the guard frequency region may be shared between the IAB node and the base station or the parent IAB node through a higher layer signal (e.g., RRC signaling, MAC CE), a physical signal (e.g., DCI), or a backhaul signal.

Next, DU resource types and IAB node operations for the SDM support of the IAB node are described, through beam allocation of FIG. 7.

The base station or the parent IAB node may configure to the IAB node up to 128 transmission configuration indication (TCI) states for the DU and the MT of the IAB node through a higher signal or a backhaul signal. The TCI state may include the following beam related information.

TCI state ID at least one or more quasi-co-located (QCL) information

Each QCL information may include the cell ID, bandwidth part (BWP) ID, reference signal information (e.g., CSI-RS ID information if the reference signal is CSI-RS, SSB index information if the reference signal is SSB), and information of whether the QCL type is a type A, a type B, a type C, or a type D.

Next, the base station or the parent IAB node may activate up to 8 TCI states of the 128 TCI states for the DU and the MT of the IAB node through a MAC CE signal or a backhaul signal to the IAB node. The base station or the parent IAB node may indicate at least one or more TCI states between the activated 8 TCI states through a physical signal to the IAB node. The DU and the MT of the IAB node each may transmit and receive data through at least one or more specific beams according to the at least one or more TCI states indicated. At this time, the DU of the IAB node may coordinate the beam to use with the base station or the parent IAB node.

As a first alternative for the beam coordination, the CU may configure a hard type 751, a soft type 752, and a NA type 753 for specific beam(s) corresponding to the TCI state to the DU of the IAB node. That is, the resource type of the DU may be configured on the beam basis. In the beam of the hard type 751, the DU of the IAB node may transmit and receive data by using the beam of the hard type 751 regardless of impact on the transmission and reception beam of the MT of the IAB node. In the beam of the soft type 752, the DU of the IAB node may transmit and receive data by using the beam of the soft type 752, without affecting the transmission and reception beam of the MT of the IAB node. Not affecting the MT of the IAB node shall be further explained in the following cases. The MT of the IAB node does not transmit and receive during the frequency time resource of the DU of the IAB node. Alternatively, the transmission and reception of the MT of the IAB node do not change due to the transmission and reception of the DU of the IAB node during the frequency time resource. Alternatively, the MT of the IAB node receives the DCI format indicating that the soft-type resource is available. Next, the DU of the IAB node does not transmit or receive data in the beam of the NA type 753.

As a second alternative for the beam coordination, the CU may configure the hard type, the soft type, and the NA type in alternation 761 and 762 for specific beams corresponding to the TCI state for a specific time (slot or symbol) to the DU of the IAB node. The base station or the parent IAB node may transmit the configuration information to the IAB node through a higher layer signal (e.g., RRC signaling, MAC CE) or a backhaul signal. The configuration information may include bitmap information of the hard type, the soft type, and the NA type of the specific time, period and offset information of the hard type, the soft type, and the NA type, and TCI state information to which the DU type information is applied.

As a third alternative for the beam coordination, the CU may configure only the hard type and the NA type for specific beams corresponding to the TCI state to the DU of the IAB node. Since it is difficult for the DU of the IAB node to determine the impact on the MT of the IAB node in the soft type, only the hard type and the NA type may be applied. Applying the hard type and the NA type may be used as the first alternative or the second alternative.

As a fourth alternative for the beam coordination, the CU may configure an available beam for the DU or a non-available beam for the DU, instead of the hard type and the NA type, for specific beams corresponding to the TCI state to the DU of the IAB node. The DU available beam or the DU non-available beam may be configured by the base station or the parent IAB node with a higher signal or a backhaul signal. In some embodiments, the available beam and the non-available beam may be fixed regardless of the time, and beam information may be configured. Also, in some embodiments, the configuration information may include information (e.g., bitmap information) of the available beam or the non-available beam of the DU at a specific time. Also, in some embodiments, the configuration information may include period and offset information of the available beam or the non-available beam of the DU. Also, in some embodiments, the configuration information may include at least one of TCI state information applying the beam information of the available beam or the non-available beam of the time. The configuration information according to embodiments of the disclosure may include one or more or a combination of the above-mentioned information.

Information of which one of the TDM (the multiplexing by the time radio resource scheme described in FIG. 5), the FDM (the multiplexing by the time-frequency radio resource described in FIG. 7), and the SDM (the multiplexing by the beam radio resource described in FIG. 7) is used may be determined in various manners.

According to embodiments of the disclosure, if the IAB node initially accesses the base station or the upper IAB node, the IAB node may transmit the capability information of the multiplexing scheme to the base station or the upper IAB node (e.g., the parent IAB node).

Alternatively, according to embodiments of the disclosure, the IAB node may receive from a corresponding base station or upper IAB nodes the information of the multiplexing scheme to use through higher layer signaling information (a higher layer signal) such as system information, RRC information or MAC CE, or a physical signal.

Alternatively, according to embodiments of the disclosure, after the initial access, the IAB node may receive from the base station or upper IAB nodes the information of the multiplexing scheme to use through a higher signal, a backhaul signal, or a physical signal in the backhaul link.

Alternatively, according to embodiments of the disclosure, after the IAB node transmits the capability information to the base station or the upper IAB node, the multiplexing scheme to use may be the implementation of the IAB node. Next, the IAB node may report the multiplexing scheme to use in a specific slot or radio frame, a specific duration, or continuously, to the base station or the upper IAB nodes through backhaul higher layer signaling or a physical signal. Hence, to support the multiplexing scheme switching in real time, the IAB node may be pre-configured or receive from the base station or the parent IAB node, radio resource configuration information including necessary DU resource type information for operating the TDM (multiplexing by the time radio resource scheme described in FIG. 5), the FDM (multiplexing by the time-frequency radio resource described in FIG. 7), and the SDM (multiplexing by the beam radio resource described in FIG. 7) through signaling (e.g., a higher layer signal, a backhaul signal, a physical signal). Alternatively, after the IAB node transmits the capability information to the base station or the upper IAB node, the IAB node may be pre-configured or receive from the base station or the parent IAB node, radio resource configuration information including DU resource type information required to operate the multiplexing scheme supportable by the IAB node based on the capability information through signaling (e.g., a higher layer signal (e.g., RRC, MAC CE), a backhaul signal (e.g., an F1 message), a physical signal (e.g., DCI)).

The multiplexing of the FDM and the SDM may transmit and receive a large amount of data within a short time but may be considerably affected by the interference compared to the multiplexing of the TDM. Accordingly, if the DU and the MT of the IAB node is transmitting and receiving data using the FDM or the SDM and the IAB node determines that it is difficult to further perform the simultaneous transmission and reception, the IAB node does not transmit and receive data using the SDM or the FDM anymore but may transmit and receive data by switching to the TDM. Alternatively, if the DU and the MT of the IAB node is transmitting and receiving data using the FDM or the SDM and the parent IAB node indicates the fallback to the TDM, the IAB node does not transmit and receive data using the SDM or the FDM but may transmit and receive data by switching to the TDM. Now, a DU resource type configuration method of the IAB node and its IAB node procedure in switching to the TDM are described, in FIG. 8.

Figure 8:
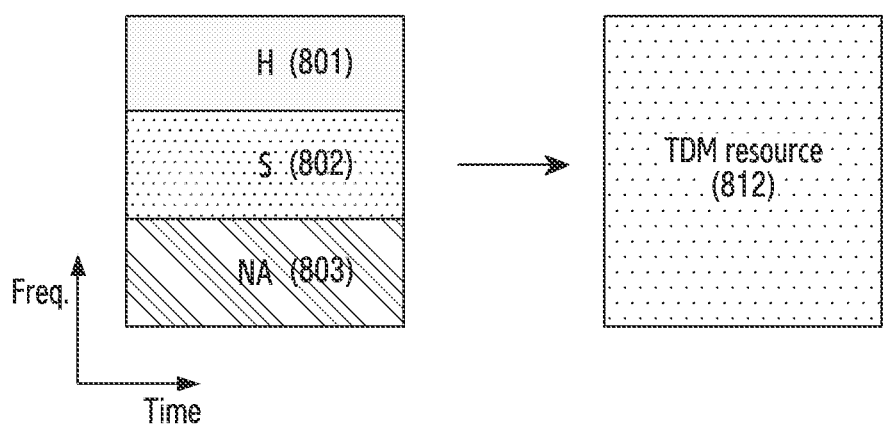
FIG. 8 illustrates that an IAB node switches from an FDM scheme to a TDM scheme in a wireless communication system according to an embodiment of the disclosure.

FIG. 8 illustrates that an IAB node switches from an FDM multiplexing scheme to a TDM multiplexing scheme in a wireless communication system according to an embodiment of the disclosure. Hereinafter, switching the TDM multiplexing scheme may be referred to as TDM fallback. It is assumed that, to support real-time switching of the multiplexing scheme, the IAB node is pre-configured or receive from the base station or the parent IAB node, the radio resource configuration information including the required DU resource type information for operating the TDM (multiplexing by the time radio resource scheme described in FIG. 5), the FDM (multiplexing by the time-frequency radio resource described in FIG. 7), and the SDM (multiplexing by the beam radio resource described in FIG. 7) through a higher layer signal, a backhaul signal, or a physical signal.

Referring to FIG. 8, the IAB node transmits and receives data in resources of a hard type 801, a soft type 802, and a NA type 803 configured from the base station or the parent IAB node. If a specific condition is satisfied, the IAB node may fall back to the TDM scheme. If the IAB node is transmitting and receiving data and the IAB node determines that it is hard to further perform the simultaneous transmission and reception, the IAB node does not transmit and receive data using the SDM or the FDM anymore but may transmit and receive data by switching to the TDM and applying a DU resource type 812 to use in the TDM. Alternatively, if the base station or the parent IAB node indicates the switching to the TDM with a physical signal and the IAB node receives the physical signal, the IAB node does not transmit and receive data using the SDM or the FDM anymore but may transmit and receive data by switching to the TDM and applying the DU resource type 812 to use in the TDM. Alternatively, if the IAB node determines beam failure, the IAB node does not transmit and receive data using the SDM or the FDM anymore but may transmit and receive data by switching to the TDM and applying the DU resource type 812 to use in the TDM.

If the MT of the IAB node is transmitting and receiving data to and from the base station or the parent IAB node and has not yet finished the data transmission and reception before switching to the TDM, the MT of the IAB node may not be guaranteed to complete the data transmission and reception in the radio resource configured to use in the switching to the TDM, that is, the DU resource type 812 (particularly, if the DU resource type is the hard type). Thus, three alternatives for addressing the issue are described.

As the first alternative, the IAB node may determine the TDM DU resource 812 as the soft type if falling back to the TDM regardless of the TDM DU resource configuration 812 pre-configured or received from the base station or the parent IAB node. That is, even though the TDM DU resource type pre-configured or received from the base station or the parent IAB node is the hard type, the IAB node determines the TDM DU resource 812 as the soft type. In the soft type, the DU of the IAB node may transmit and receive data using the resource not to impact on the transmission and reception of the MT of the IAB node. Hence, the MT of the IAB node may be guaranteed with the data transmission and reception not finished.

As the second alternative, even though the TDM DU resource configuration 812 pre-configured or received from the base station or the parent IAB node is the hard type, the ongoing data transmission and reception of the MT of the IAB node may have a priority, to finish the ongoing IAB node data transmission and reception of the MT of the IAB node. That is, if the pre-configured TDM DU resource 812 is the hard type, the DU of the IAB node may transmit and receive data regardless of the impact on the transmission and reception of the MT of the IAB node. However, if falling back to the TDM, the DU of the IAB node may give a priority to the MT of the IAB node for the ongoing data transmission and reception of the MT of the IAB node, to transmit and receive data by using the resource not to affect the transmission and reception of the MT of the IAB node. If the MT of the IAB node finishes the data transmission and reception, the DU of the IAB node may transmit and receive data in the hard type as defined regardless of the impact on the transmission and reception of the MT of the IAB node.

In the third alternatively, the IAB node transmits to the base station or the parent IAB node a report of no transmission and reception guaranteed of the MT of the IAB node (or a report of the TDM DU resource type and the configuration at the fallback) in the TDM DU resource type 812. The base station or the parent IAB node receiving the report may re-schedule the unfinished data in other resource.

A fallback duration (or a duration for applying the above alternatives) to the TDM may be determined in various manners. In some embodiments, the fallback duration may be a predefined value. In some other embodiments, the IAB node may receive fallback duration configuration from the base station or the parent IAB node through a higher layer signal (e.g., RRC signaling, MAC CE), a backhaul signal (e.g., F1 interface), or a physical signal (e.g., DCI). In some other embodiments, the fallback duration may be determined by receiving a signal (e.g., a physical signal (e.g., DCI)) for transmitting and receiving data back in the FDM or the SDM.

Figure 9A:
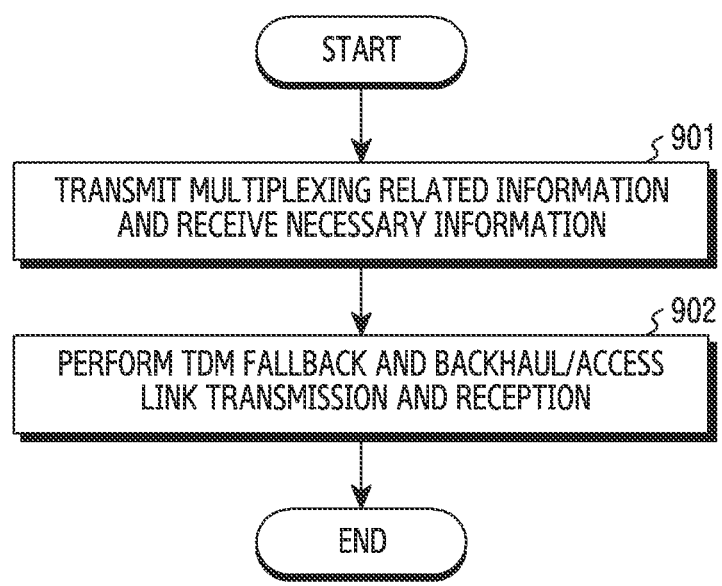
FIG. 9A illustrates a flowchart of a base station or a parent IAB node for performing a multiplexing operation in a wireless communication system according to an embodiment of the disclosure.

FIG. 9A illustrates a flowchart of a base station or a parent IAB node for performing a multiplexing operation in a wireless communication system according to an embodiment of the disclosure. The base station may represent the base station serving as the donor of the parent IAB node.

Referring to FIG. 9A, in operation 901, the base station or the parent IAB node may transmit multiplexing related information to the IAB node, and receive necessary information from the IAB node. According to embodiments, the base station or the parent IAB node may receive multiplexing related information after receiving necessary information, or receive necessary information after transmitting multiplexing related information.

The base station or the parent IAB node may transmit the multiplexing related information to the lower IAB node. The multiplexing related information may indicate information related to the multiplexing between the MT of the IAB node and the DU of the IAB node. Herein, the multiplexing may include at least one of the TDM, the FDM, and the SDM. The multiplexing related information may include at least one of TDM related information, FDM related information, and SDM related information. That is, the base station or the parent IAB node may transmit the TDM, FDM or SDM related information to the IAB node and receive the necessary information from the IAB node according to an embodiment of the disclosure, as mentioned in FIG. 8. The multiplexing related information may be delivered to the lower IAB node through higher layer signaling (e.g., RRC, MAC CE), physical layer signaling (e.g., DCI), or a backhaul signal (e.g., a message on the F1 interface).

According to embodiments of the disclosure, the multiplexing related information may include necessary information for switching to the TDM, the FDM or the SDM, necessary information for supporting the TDM, the FDM or the SDM, and so on. According to an embodiment, the multiplexing related information may include DU resource type information. The DU resource type information may indicate the hard type, the soft type, and the NA type of the downlink resource, the uplink resource, and the flexible resource. Each type may define the DU operation of the IAB node in the corresponding resource.

According to an embodiment, the multiplexing related information may include beam information to use. The beam information may indicate the TCI state to be used by each IAB node. The TCI state may include QCL information. The QCL information may include QCL type and reference signal information (e.g., SSB index or CSI-RS resource).

According to an embodiment, the multiplexing related information may indicate an available beam of the DU and an unavailable beam of the DU. In some embodiments, the indication of the available beam and the unavailable beam may be fixed regardless of the time. In some other embodiments, the indication of the available beam and the unavailable beam may be set based on the time. For example, a period and an offset may be set for the beams. For example, a bitmap indicating a time unit (e.g., a slot, a symbol) of the beams may be set. In some other embodiments, the available beam and the unavailable beam may be indicated in a semi-persistent manner. Use of the configured beams may be indicated by activating or deactivating control signaling (e.g., MAC CE or DCI).

The necessary information for supporting the TDM, the FDM or the SDM may include radio resource allocation information including the DU resource type, soft-type resource availability information, guard frequency information, TCI state configuration information, DU resource type configuration information of specific beams corresponding to the TCI state, configuration information of whether the DU is available or not, and the like.

According to an embodiment, the multiplexing related information may include TDM fallback related information.

Besides the aforementioned information, the multiplexing related information described in FIGS. 1, 2, 3A, 3B, 4A, 4B, 5 to 7, and 8 may be transmitted from the parent IAB node or the base station to the child IAB node.

The base station or the parent IAB node may receive the necessary information from the lower IAB node. According to embodiments of the disclosure, the necessary information indicates information transmitted from the IAB node to the parent IAB node or the base station. According to an embodiment, the necessary information may include a measurement report of the IAB node. According to an embodiment, the necessary information may include capability information of the IAB node. According to an embodiment, the necessary information may include a status report (e.g., indicating that the transmission and reception of the MT is not guaranteed).

Besides the above information, the necessary information described in FIGS. 1, 2, 3A, 3B, 4A, 4B, 5 to 7, and 8 may be received from the parent IAB node.

In operation 902, the base station or the parent IAB node may perform the TDM fallback, and transmit and receive data to and from the IAB node. According to an embodiment, the base station or the parent IAB node may indicate the TDM fallback to the lower IAB node. According to an embodiment, the lower IAB node may determine the TDM fallback. It will be understood as the embodiment of the disclosure that the lower IAB node determines the TDM fallback, and accordingly the base station or the parent IAB node transmits and receives backhaul data, unlike FIG. 9A. The base station or the parent IAB node transmits and receives the backhaul data to and from the IAB node by applying the fallback to the TDM according to an embodiment of the disclosure, as described in FIG. 8.

Figure 9B:
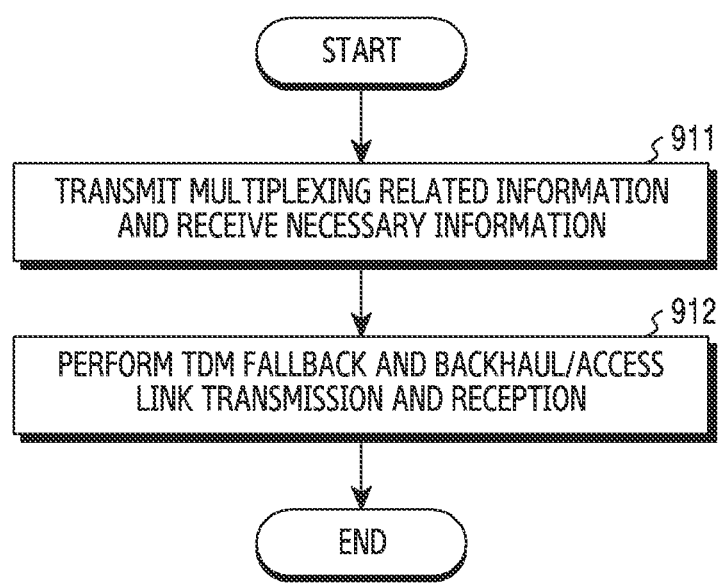
FIG. 9B illustrates a flowchart of an IAB node for performing a multiplexing operation in the wireless communication system according to an embodiment of the disclosure.

FIG. 9B illustrates a flowchart of the IAB node for performing the multiplexing operation in the wireless communication system according to an embodiment of the disclosure. The IAB node may communicate the parent IAB node or the base station (i.e., the IAB donor).

Referring to FIG. 9B, the IAB node may receive the multiplexing related information and transmit the necessary information in operation 911. The IAB node of FIG. 8 receives the TDM, FDM, or SDM related information from the base station or the parent IAB node and transmits the necessary information to the base station or the parent IAB node as explained in FIG. 8. The information may include the necessary information for switching to the TDM, the FDM, or the SDM, the necessary information for supporting the TDM, the FDM, or the SDM, and the like as explained earlier. The necessary information for supporting the TDM, the FDM or the SDM may include the radio resource allocation information including the DU resource type, the soft-type resource availability information, the guard frequency information, the TCI state configuration information, the DU resource type configuration information of specific beams corresponding to the TCI state, the configuration information of whether the DU is available or not, and the like. Operation 911 corresponds to operation 901 of FIG. 9A, and the embodiment of the multiplexing related information and the necessary information may be applied to the IAB node of FIG. 9B.

In operation 912, the IAB node may transmit and receive backhaul data to the base station or the parent IAB node by applying the fallback to the TDM. According to an embodiment, the TDM fallback may be indicated from the parent IAB node or the base station. According to an embodiment, the IAB node may determine the TDM fallback, by determining whether the DU and the MT of the IAB node may simultaneously transmit and receive data. Operation 912 corresponds to operation 902 of FIG. 9A, and the embodiment of the data transmission and reception may be applied to the IAB node of FIG. 9B.

The beam described in the specification indicates a spatial signal flow in the radio channel, and is formed by one or more antennas (or antenna elements), which may be referred to as beamforming According to various embodiments, an antenna array including a plurality of antenna elements may be used, and the form (i.e., coverage) based on a signal gain may have a direction. A beam used in the signal transmission may be referred to as a transmit beam and a beam used in the signal reception may be referred to as a receive beam. That is, the IAB node may include an antenna array for the MT or an antenna array for the DU, as one implementation.

If the IAB node transmits a signal in the transmit beam direction, the signal gain of the device may increase. If transmitting the signal using the transmit beam, the signal may be transmitted through a spatial domain transmission filter of a signal transmission side, that is, a transmitting stage. If transmitting a signal using a plurality of transmit beams, the transmitting stage may transmit the signal by changing the spatial domain transmission filter. For example, in the transmission using the same transmit beam, the transmitting stage may transmit the signal through the same spatial domain transmission filter.

If the IAB node receives a signal in the receive beam direction, the signal gain of the device may increase. If receiving the signal using the receive beam, the signal may be received through a spatial domain reception filter of a signal reception side, that is, a receiving stage. For example, if the IAB node simultaneously receives several signals transmitted using different beams, the IAB node may receive the signals by using a single spatial domain reception filter, or may receive the signals by using multiple spatial domain reception filters.

In the disclosure, a reference signal may be transmitted based on the beam. For example, the beamformed reference signal may include a demodulation-reference signal (DM-RS), a CSI-RS, an SS/PBCH, or a sounding reference signal (SRS).

To indicate the signal transmitted using the beam, or the resource allocated to the beam in the disclosure, a reference signal configuration may be used. An indicator such as a CSI-RS resource or an SRS-resource may be used, as the reference signal configuration. According to embodiments of the disclosure, beam information may include information associated with the reference signal. The information associated with the reference signal may indicate whether the corresponding configuration (e.g., a CSI-RS resource) uses the same spatial domain filter as another configuration (e.g., another CSI-RS resource in the same CSI0RS resource set) or a different spatial domain filter, which reference signal is QCL, and if QCL, which type (e.g., QCL types A, B, C, D) it is. According to embodiments of the disclosure, the beam information may include the reference signal configuration and QCL information. According to an embodiment, the beam information may be referred to as the TCI state. The QCL types may be defined as follows.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In the disclosure, according to various embodiments, the IAB node may measure a beam quality, to acquire a cell quality and a duplex quality. The IAB node may obtain the beam quality based on the CSI-RS or the SS/PBCH block.

The IAB node according to various embodiments of the disclosure may support the FDM and the SDM between the MT and the DU of the IAB node. The IAB node may receive the DU resource type from the upper IAB node or the base station (e.g., the IAB donor or the CU). If falling from the FDM or the SDM back to the TDM, the IAB node may perform data transmission and reception based on the DU resource type. Thus, robust data transmission and reception of the IAB node may be achieved.

Figure 10:
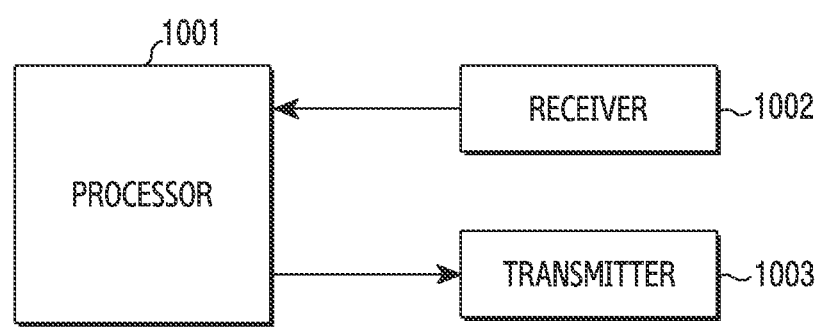
FIG. 10 illustrates a configuration of a terminal according to an embodiment of the disclosure.
Figure 11:
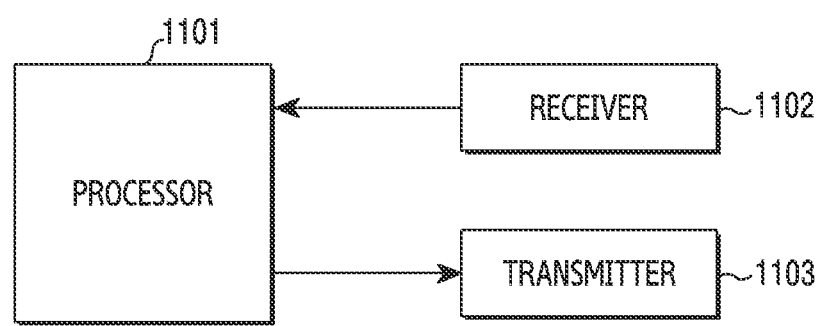
FIG. 11 illustrates a configuration of a base station according to an embodiment of the disclosure.
Figure 12:
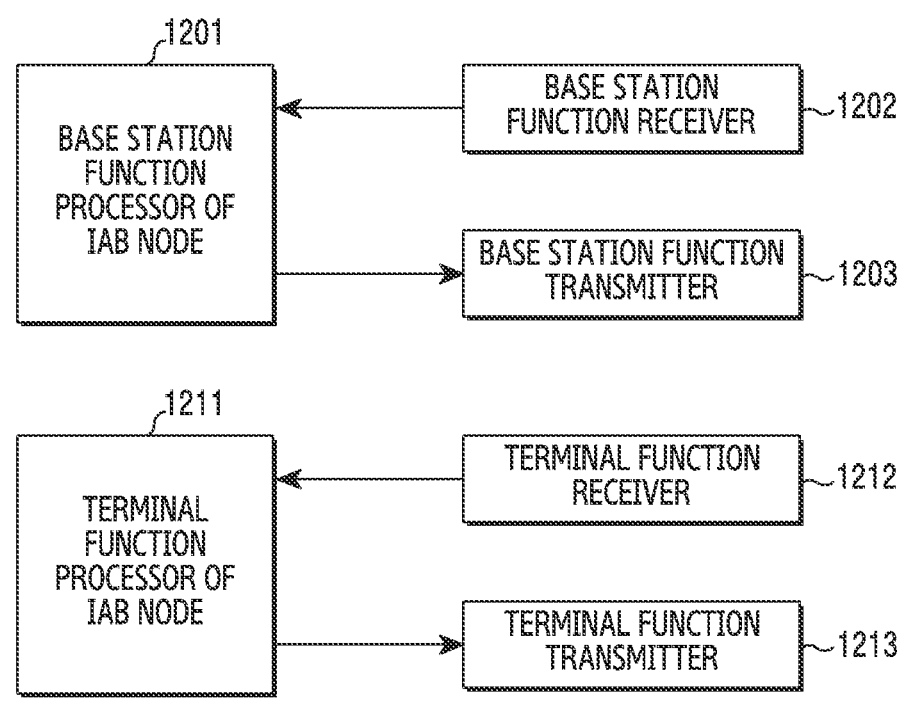
FIG. 12 illustrates a configuration of an IAB node according to an embodiment of the disclosure.

To carry out the embodiments of the disclosure, FIGS. 10 and 11 illustrate a transmitter, a receiver, and a processor of the terminal and the base station. The transmitter and the receiver may be referred to as a transceiver. FIG. 12 illustrates a device of the IAB node. If the 5G communication system explained in the above embodiments transmits and receive signals in the backhaul link or the access link through the IAB node, transceiving methods of the base station (the donor base station) which transmits and receives data to and from the IAB node in the backhaul link and the terminal which transmits and receives data to and from the IAB node in the access link through the 5G frequency band (e.g., FR1 or FR2 of the mmWave) are shown, and the transmitter, the receiver, the processor of the base station, the terminal and the IAB node may operate according to an embodiment.

FIG. 10 illustrates a configuration of a terminal according to an embodiment of the disclosure.

Referring to FIG. 10, the terminal of the disclosure may include a processor 1001, a receiver 1002, and a transmitter 1003.

The processor 1001 may control a series of processes in which the terminal may operate according to embodiments of the disclosure of FIGS. 1, 2, 3A, 3B, 4A, 4B, 5 to 8, 9A, and 9B alone or in combination. For example, the access link transmission and reception with the IAB node may be controlled differently according to embodiments of the disclosure. The receiver 1002 and the transmitter 1003 may be collectively referred to as a transceiver in the embodiment of the disclosure. The transceiver may transmit and receive signals to and from the base station. The signal may include at least one of control information and data. For doing so, the transceiver may include an RF transmitter which up-converts and amplifies the frequency of the transmitted signal, and an RF receiver which amplifies the received signal with low noise and down-converts the frequency. In addition, the transceiver may receive a signal over a radio channel, output it to the processor 1001, and transmit a signal outputted from the processor 1001 over the radio channel.

FIG. 11 illustrates a configuration of a base station (a donor base station) according to an embodiment of the disclosure. The base station may function as the donor as the parent IAB node.

Referring to FIG. 11, the base station of the disclosure may include a processor 1101, a receiver 1002, and a transmitter 1103.

The processor 1101 may control a series of processes to operate the base station according to embodiments of the disclosure of FIGS. 1, 2, 3A, 3B, 4A, 4B, 5 to 8, 9A, and 9B alone or in combination. For example, the backhaul link transmission and reception and the access link transmission and reception with the IAB node may be controlled differently according to embodiments of the disclosure. The receiver 1102 and the transmitter 1103 may be collectively referred to as a transceiver in the embodiment of the disclosure. The transceiver may transmit and receive signals to and from the terminal or the (child) IAB node. The signal may include at least one of control information and data. For doing so, the transceiver may include an RF transmitter which up-converts and amplifies the frequency of the transmitted signal, and an RF receiver which amplifies the received signal with low noise and down-converts the frequency. In addition, the transceiver may receive a signal over a radio channel, output it to the processor 1101, and transmit a signal outputted from the processor 1101 over the radio channel.

FIG. 12 illustrates a configuration of an IAB node according to an embodiment of the disclosure.

Referring to FIG. 12, the IAB node of the disclosure may include a base station function processor 1201 of the IAB node for transmitting and receiving data to and from the lower (child) IAB node through the (wireless) backhaul link, a base station function receiver 1202, and a base station function transmitter 1203. In addition, the IAB node may include a terminal function processor 1211 of the IAB node for initially accessing the upper (parent) IAB node and/or the donor base station, transmitting and receiving a high layer signal before transmitting and receiving in the backhaul link, and transmitting and receiving data to and from the upper (parent) IAB node and the donor base station through the (wireless) backhaul link, a terminal function receiver 1212, and a terminal function transmitter 1213.

The base station function processor 1201 of the IAB node may control a series of processes to operate the IAB node with the base station according to an embodiment of the disclosure, and for example, may perform the functions of the DU of the IAB node as explained earlier. For example, the base station function processor 1201 may differently control the backhaul link transmission and reception with the lower IAB node and the access link transmission and reception with the terminal according to an embodiment of the disclosure. The base station function receiver 1202, and the base station function transmitter 1203 may be collectively referred to as a first transceiver in the embodiment of the disclosure. The first transceiver may transmit and receive signals to and from the lower (child) IAB node and the terminal. The signal may include at least one of control information and data. For doing so, the first transceiver may include an RF transmitter which up-converts and amplifies the frequency of the transmitted signal, and an RF receiver which amplifies the received signal with low noise and down-converts the frequency. In addition, the first transceiver may receive a signal over a radio channel, output it to the base station function processor 1201, and transmit a signal outputted from the base station function processor 1201 over the radio channel.

The terminal function processor 1211 of the IAB node may control a series of processes to operate the lower (child) IAB node with the terminal for the data transmission and reception with the donor base station or the upper (parent) IAB node according to an embodiment of the disclosure, and for example, may perform the functions of the MT of the IAB node as explained earlier. For example, the terminal function processor 1211 may differently control the (wireless) backhaul link transmission and reception with the donor base station and/or the upper (parent) IAB node according to an embodiment of the disclosure. The terminal function receiver 1212, and the terminal function transmitter 1213 may be collectively referred to as a second transceiver in the embodiment of the disclosure. The second transceiver may transmit and receive signals to and from the donor base station and the upper IAB node. The signal may include at least one of control information and data. For doing so, the second transceiver may include an RF transmitter which up-converts and amplifies the frequency of the transmitted signal, and an RF receiver which amplifies the received signal with low noise and down-converts the frequency. In addition, the second transceiver may receive a signal over a radio channel, output it to the terminal function processor 1211, and transmit a signal outputted from the terminal function processor 1211 over the radio channel.

Meanwhile, the base station function processor 1201 of the IAB node and the terminal function processor 1211 of the IAB node included in the IAB node of FIG. 12 may be integrated and implemented as an IAB node processor. In this case, an IAB node processor 1200 may control the functions of the DU and the MT together in the IAB node. The base station function processor 1201, the terminal function processor 1211, and the IAB node processor may be implemented as at least one processor. The first transceiver and the second transceiver may be included individually or integrated as one transceiver.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first integrated access and backhaul (IAB) node in a wireless communication system, the method comprising:
    receiving, from a second IAB node, multiplexing scheme configuration information of data transmitted or received by a mobile termination (MT) and a distributed unit (DU) included in the first IAB node;
    based on the multiplexing scheme configuration information, determining a multiplexing scheme to be used by the first IAB node to among a spatial division multiplexing (SDM) scheme or a frequency division multiplexing (FDM) scheme;
    transmitting or receiving data using the SDM scheme or the FDM scheme;
    identifying whether a fallback condition from the SDM scheme or the FDM scheme to a time division multiplexing, TDM, scheme is satisfied;
    controlling data transmission and reception of the MT, and data transmission and reception of the DU on an allocated radio resource for transmission and reception of the TDM scheme based on the multiplexing scheme configuration information and the data transmission and reception of the MT before switching to the TDM scheme, in case that the data transmission and reception of the MT on the allocated radio resource is not complete,
        wherein the allocated radio resource is determined a soft type resource, for the transmission and reception of the MT that does not affect the transmission and reception of the DU, or
        wherein the transmission and reception of the MT has priority to the data transmission and reception of the DU; and
    switching the multiplexing scheme to be used by the first IAB node to the TDM scheme, in case that the fallback condition to the TDM scheme is satisfied.

2. The method of claim 1,
    wherein the multiplexing scheme configuration information comprises at least one of information for switching to the TDM scheme, the FDM scheme or the SDM scheme, information of a radio resource type controlled by the DU of the first IAB node, or beam related information to be used in the SDM scheme, and
    wherein the radio resource type controlled by the DU of the first IAB node comprises one of a soft type indicating whether the radio resource is available for the DU, a hard type indicating that the radio resource is always available, or a non-available (NA) type indicating that the radio resource is always unavailable.

3. The method of claim 2, wherein the beam related information comprises at least one of resource type information to be configured in at least one beam, transmission configuration indication (TCI) state identification information or quasi-co-located (QCL) information.

4. The method of claim 1, wherein the controlling of the data transmission and reception of the MT, and the data transmission and reception of the DU on the allocated radio resource for the transmission and reception of the TDM scheme comprises:
   transmitting, to the second IAB node, information indicating that the data transmission or reception of the MT is not guaranteed.

5. The method of claim 1,
   wherein the multiplexing scheme configuration information is received through at least one of higher layer signaling, a backhaul signal, or physical layer signaling, and
   wherein the second IAB node is one of a base station or an upper IAB node.

6. The method of claim 1, wherein the identifying of whether the fallback condition to the TDM scheme is satisfied is based on one of whether an indication is received from the second IAB node, whether a beam failure is detected, or a communication environment of the first IAB node.

7. A method performed by a second integrated access and backhaul (IAB) node in a wireless communication system, the method comprising:
   transmitting, from a first IAB node, multiplexing scheme configuration information of data transmitted or received by a mobile termination (MT) and a distributed unit (DU) included in the first IAB node;
   based on the multiplexing scheme configuration information, transmitting or receiving data to or from the first IAB node using one of a spatial division multiplexing (SDM) scheme or a frequency division multiplexing (FDM) scheme;
   receiving, from the first IAB node, information indicating that data transmission or reception of the MT is not guaranteed based on fallback to a time division multiplexing (TDM) scheme of the first IAB node;
   allocating a radio resource for the data transmission or reception of the MT of the first IAB node; and
   transmitting, to the first IAB node, information on the allocated radio resource.

8. The method of claim 7,
   wherein the multiplexing scheme configuration information comprises at least one of information for switching to the TDM scheme, the FDM scheme or the SDM scheme, information of a radio resource type controlled by the DU of the first IAB node, or beam related information to be used in the SDM scheme, and
   wherein the radio resource type controlled by the DU of the first IAB node comprises one of a soft type indicating whether the radio resource is available for the DU, a hard type indicating that the radio resource is always available, or a non-available (NA) type indicating that the radio resource is always unavailable.

9. A first integrated access and backhaul (IAB) node in a wireless communication system, the first IAB node comprising:
   a transceiver; and
   at least one processor coupled with the transceiver,
   wherein the at least one processor is configured to:
     receive, from a second IAB node, multiplexing scheme configuration information of data transmitted or received by a mobile termination (MT) and a distributed unit (DU) included in the first IAB node,
     based on the multiplexing scheme configuration information, determine a multiplexing scheme to be used by the first IAB node to among a spatial division multiplexing (SDM) scheme or a frequency division multiplexing (FDM) scheme,
     transmit or receive data using the SDM scheme or the FDM scheme,
     identify whether a fallback condition from the SDM scheme or the FDM scheme to a time division multiplexing (TDM) scheme is satisfied,
     control data transmission and reception of the MT, and data transmission and reception of the DU on allocated radio resource for transmission and reception of the TDM scheme based on the multiplexing scheme configuration information and the data transmission and reception of the MT before switching to the TDM scheme, in case that the data transmission and reception of the MT on the allocated radio resource is not complete,
       wherein the allocated radio resource is determined a soft type resource, for the transmission and reception of the MT that does not affect the transmission and reception of the DU, or
       wherein the transmission and reception of the MT has priority to the data transmission and reception of the DU, and
     switch the multiplexing scheme to be used by the first IAB node to the TDM scheme, in case that the fallback condition to the TDM scheme is satisfied.

10. The first IAB node of claim 9,
   wherein the multiplexing scheme configuration information comprises at least one of information for switching to the TDM scheme, the FDM scheme or the SDM scheme, information of a radio resource type controlled by the DU of the first IAB node, or beam related information to be used in the SDM scheme, and
   wherein the radio resource type controlled by the DU of the first IAB node comprises one of a soft type indicating whether the radio resource is available for the DU, a hard type indicating that the radio resource is always available, or a non-available (NA) type indicating that the radio resource is always unavailable.

11. The first IAB node of claim 10, wherein the beam related information comprises at least one of resource type information to be configured in at least one beam, transmission configuration indication (TCI) state identification information and quasi-co-located (QCL) information.

12. The first IAB node of claim 9, wherein, controlling the data transmission and reception of the MT, and the data transmission and reception of the DU on the allocated radio resource for transmission and reception of the TDM scheme, the at least one processor is configured to:
   transmit, to the second IAB node, information indicating that the data transmission or reception of the MT is not guaranteed.

13. The first IAB node of claim 9,
   wherein the multiplexing scheme configuration information is received through at least one of higher layer signaling, a backhaul signal or physical layer signaling, and
   wherein the second IAB node is one of a base station or an upper IAB node.

14. The first IAB node of claim 9, wherein the identifying of whether the fallback condition to the TDM scheme is satisfied is based on whether an indication is received from the second IAB node, whether beam failure is detected, or a communication environment of the first IAB node.

15. A second integrated access and backhaul (IAB) node in a wireless communication system, the second IAB node comprising:
   a transceiver; and
   at least one processor coupled with the transceiver, wherein the at least one processor is configured to:
  transmit, from a first IAB node, multiplexing scheme configuration information of data transmitted or received by a mobile termination (MT) and a distributed unit (DU) included in a first IAB node,
  based on the multiplexing scheme configuration information, transmit or receive data to or from the first IAB node using one of a spatial division multiplexing (SDM) scheme or a frequency division multiplexing (FDM) scheme,
  receive, from the first IAB node, information indicating that data transmission or reception of the MT is not guaranteed based on fallback to a time division multiplexing (TDM) scheme of the first IAB node,
  allocate a radio resource for the data transmission or reception of the MT of the first IAB node, and
  transmit, to the first IAB node, information on the allocated radio resource.

16. The second IAB node of claim 15,
  wherein the multiplexing scheme configuration information comprises at least one of information for switching to the TDM scheme, the FDM scheme or the SDM scheme, information of a radio resource type controlled by the DU of the first IAB node, or beam related information to be used in the SDM scheme, and
  wherein the radio resource type controlled by the DU of the first IAB node comprises one of a soft type indicating whether the radio resource is available for the DU, a hard type indicating that the radio resource is always available, or a non-available (NA) type indicating that the radio resource is always unavailable.

* * * * *